US008938765B2

(12) United States Patent
Benya et al.

(10) Patent No.: US 8,938,765 B2
(45) Date of Patent: Jan. 20, 2015

(54) METHODS, APPARATUS AND USER INTERFACE FOR PROVIDING CONTENT ON DEMAND

(75) Inventors: Robert Benya, Breezy Point, NY (US); James Kasanin, Brooklyn, NY (US); Glen Hardin, Charlotte, NC (US)

(73) Assignee: Time Warner Cable Enterprises LLC, New York, NY (US)

(*) Notice: Subject to any disclaimer, the term of this patent is extended or adjusted under 35 U.S.C. 154(b) by 410 days.

(21) Appl. No.: 11/615,888

(22) Filed: Dec. 22, 2006

(65) Prior Publication Data

US 2008/0155613 A1    Jun. 26, 2008

(51) Int. Cl.
| | |
|---|---|
| H04N 7/173 | (2011.01) |
| H04N 21/222 | (2011.01) |
| H04N 21/231 | (2011.01) |
| H04N 21/258 | (2011.01) |
| H04N 21/472 | (2011.01) |

(Continued)

(52) U.S. Cl.
CPC ....... *H04N 7/17318* (2013.01); *H04N 7/17354* (2013.01); *H04N 21/2221* (2013.01); *H04N 21/23103* (2013.01); *H04N 21/23116* (2013.01); *H04N 21/25875* (2013.01); *H04N 21/47202* (2013.01); *H04N 21/4828* (2013.01); *H04N 21/6125* (2013.01)
USPC .............. 725/86; 725/109; 725/110; 709/231

(58) Field of Classification Search
USPC ......... 725/39, 46, 47, 50, 53, 86, 87, 89, 101, 725/109, 110, 34, 35; 709/231; 348/E7.071
See application file for complete search history.

(56) References Cited

U.S. PATENT DOCUMENTS

| | | | |
|---|---|---|---|
| 5,898,456 A | 4/1999 | Wahl | |
| 5,916,303 A * | 6/1999 | Scott | 709/217 |

(Continued)

FOREIGN PATENT DOCUMENTS

| | | |
|---|---|---|
| CA | 2246933 | 1/2012 |
| WO | WO02/065732 | 8/2002 |

OTHER PUBLICATIONS

The International Search Report and The Written Opinion of the International Searching Authority, from International Application No. PCT/US 07/88651, dated Jun. 11, 2008, 9 pages total.

*Primary Examiner* — Brian T Pendleton
*Assistant Examiner* — Alan Luong
(74) *Attorney, Agent, or Firm* — Straub & Pokotylo; Michael P. Straub; Stephen T. Straub

(57) ABSTRACT

Methods and apparatus for supporting content delivery service are described. In accordance with the invention content can be supplied to temporary storage of a regional or local server used to supply the content to a customer's premises when the requested content is not already available in the regional or local server. A content server hierarchy may be implemented with servers higher up in the hierarchy including more content, e.g., titles, than the number of titles stored in the lower level servers. By storing less frequently accessed content in servers higher in the hierarchy and frequently requested titles lower in the hierarchy, a vast number of titles can be supported without overburdening the storage available at local and regional servers. In addition, a national or other server high in the hierarchy can be used to store, move, and distribute local or other content as part of an on demand service.

26 Claims, 23 Drawing Sheets

(51) Int. Cl.
*H04N 21/482* (2011.01)
*H04N 21/61* (2011.01)

(56) References Cited

U.S. PATENT DOCUMENTS

| | | | |
|---|---|---|---|
| 6,070,186 | A | 5/2000 | Nishio |
| 6,820,277 | B1 * | 11/2004 | Eldering et al. ............. 725/35 |
| 6,850,982 | B1 * | 2/2005 | Siegel ....................... 709/227 |
| 6,868,452 | B1 * | 3/2005 | Eager et al. ................ 709/231 |
| 7,010,801 | B1 | 3/2006 | Jerding et al. |
| 7,266,832 | B2 * | 9/2007 | Miller ........................ 725/34 |
| 7,516,154 | B2 * | 4/2009 | Chan ..................... 707/999.102 |
| 7,594,254 | B2 | 9/2009 | Parnell et al. |
| 2001/0013123 | A1 | 8/2001 | Freeman et al. |
| 2003/0005457 | A1 * | 1/2003 | Faibish et al. ............... 725/94 |
| 2003/0093544 | A1 | 5/2003 | Richardson |
| 2003/0182315 | A1 * | 9/2003 | Plastina et al. ............. 707/200 |
| 2004/0163114 | A1 * | 8/2004 | Rodriguez et al. ........... 725/87 |
| 2005/0216933 | A1 | 9/2005 | Black |
| 2005/0243739 | A1 * | 11/2005 | Anderson et al. ........... 370/254 |
| 2005/0246739 | A1 * | 11/2005 | Davidson .................... 725/45 |
| 2006/0020982 | A1 * | 1/2006 | Jerding et al. ............... 725/89 |
| 2006/0143653 | A1 * | 6/2006 | Suh ............................ 725/46 |
| 2006/0146788 | A1 | 7/2006 | Brown et al. |
| 2006/0158368 | A1 | 7/2006 | Walter et al. |
| 2006/0218604 | A1 | 9/2006 | Riedl et al. |
| 2006/0271972 | A1 * | 11/2006 | Pai et al. .................... 725/86 |
| 2007/0162502 | A1 * | 7/2007 | Thomas et al. ........... 707/104.1 |
| 2008/0155059 | A1 | 6/2008 | Hardin et al. |

* cited by examiner

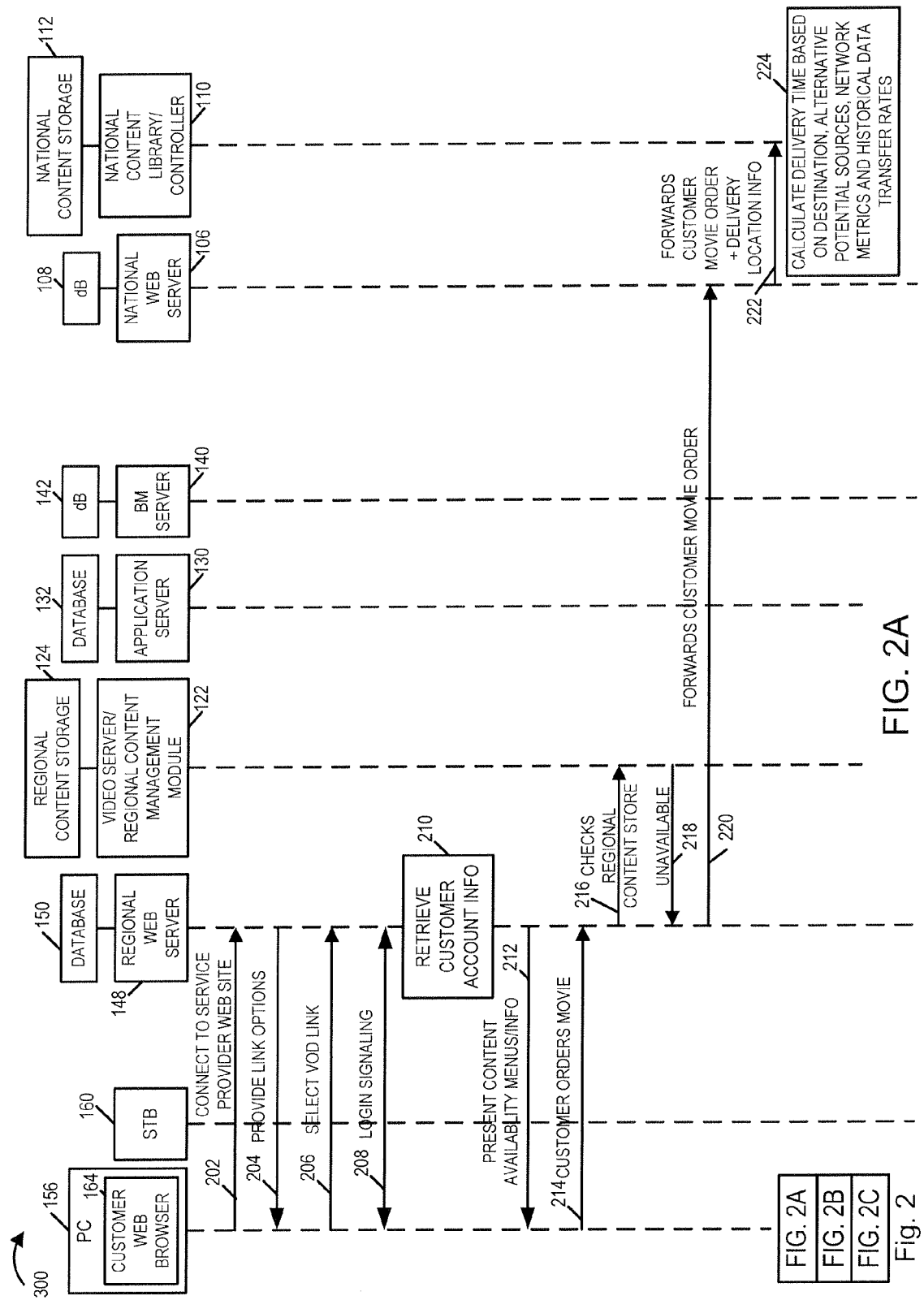

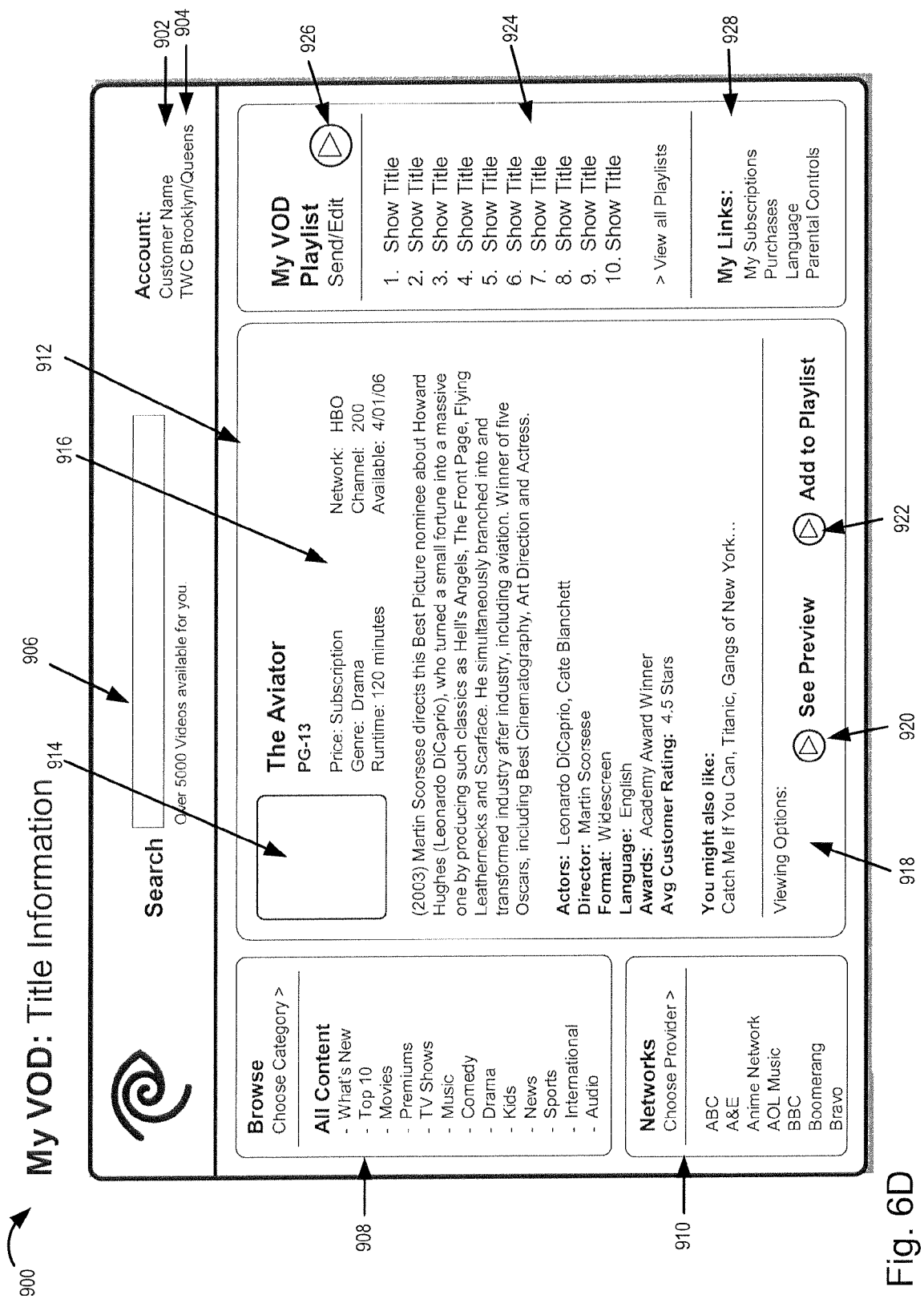

METHODS, APPARATUS AND USER INTERFACE FOR PROVIDING CONTENT ON DEMAND

FIELD OF THE INVENTION

The present invention relates to content delivery related methods and apparatus, video and, more particularly, to methods and apparatus for providing content on demand such as video, e.g., using a plurality of servers.

BACKGROUND OF THE INVENTION

Media content delivery systems often provide a combination of basic and premium services. Basic services may include a standard package of television channels while premium services may include Video on Demand (VOD) services where a subscriber may select premium content, e.g., a recent movie or sports event, to be delivered for viewing. Upon selection of a VOD content, the content is supplied to customer premise equipment, e.g., a set top box at the subscriber's residence, and the subscriber is billed for the ordered content.

Existing VOD servers used by the cable industry today tend to support standardized protocols which can be used to control the delivery of ordered content. Examples of such protocols include the ISA protocol suite which is part of the Interactive Services Architecture that was developed for cable companies with the purpose of supporting VOD services. These particular protocols are generally referred to as ISA protocols and include a Lightweight Streaming Control Protocol (ISA LSCP), ISA Session Set Up protocol (ISA SSP) and various other ISA protocols. ISA protocols are described at www.interactiveservices.org. Time Warner Cable's Session Setup Protocol (SSP) Version 2.3 dated May 19, 2003 and Lightweight Stream Control Protocol (LSCP) Version 1.1 dated Sep. 5, 2003 which are available at the www.interactiveservices.org website are both hereby expressly incorporated by reference. Additional information on ISA Lightweight service protocols is provided in: 1) the LSCP Implementation Specification Version 1.0 dated Apr. 12, 2004 (TWC-LSCPI-SP-1.0); 2) CableLabs Video-On-Demand Content Specification 1.1 (MD-SP-VOD-CONTENT1.1-I03-040107 dated Jan. 7, 2004 and 3) CableLabs Asset Distribution Interface Specification Version 1.1 (MD-SP-ADI1.1-I03-040107 dated Jan. 7, 2004 each of which is hereby expressly incorporated by reference. A derivative system which uses ISA commands to implement VOD functionality which is also used by many cable companies is the OpenStream system described at www.tandbertv.com which is an on-demand digital service platform and related protocols that allow cable operators to provide on-demand video services. These cable industry standards are used to provide the backend management functions and interface/APIs for many VOD systems currently in use by the cable industry today. Backend management functions may include such things as, session set up, controlling delivery authorization for users, network personal video record (NPVR) functions, and billing functions. Control of delivery may include supporting one or more NPVR features, in response commands received from a customer premise equipment (CPE) device.

Recent advances in broadband network used to deliver IP packet streams and IP devices, such as personal computers, personal digital assistants (PDAs), etc. have opened up new opportunities for the delivery of content, e.g., video on-demand. IP devices often rely on Real Time Streaming Protocol (RTSP) signaling to control on-demand streaming. RTSP is a client-server multimedia presentation control protocol, designed to address the need for efficient delivery of streamed multimedia over IP networks. RTSP is described in the Internet Society's Network Working Group Request for Comments (RFC) 2326 dated 1998 which is hereby expressly incorporated by reference.

As potential customers are exposed to one or more choices of content providers, and content delivery becomes more reliable, a provider's ability to distinguish itself from other content sources becomes ever more important from a business and profitability perspective. One way to distinguish over other content providers is to provide access to a large content selection. This provides not only the opportunity for increased sales due to the large number of items available but also increases the chances that a subscriber will be satisfied with the service, including available content, and remain loyal to the content provider's service.

Historically, VOD tended to be implemented with a limited selection of titles, e.g., the top 100 titles being available at any given time. Traditionally, the 100 titles might represent 800 hours of video which would have to be stored and accessible in response to subscriber requests. As the format of the content changed to higher resolution formats such as S Video and more recently to HD, the amount of data storage capacity required to store the video data has increased considerably. For example, to store the content in HD format requires approximately 4 times the amount of data storage capacity than was required for standard definition television. While the cost of data storage has decreased considerably with recent improvements in digital data storage devices, the storage requirements for maintaining a large content library remain significant. As customers expect more content choices and/or formats to be supported, the data storage requirements for a VOD service are expected to continue to increase.

Many large systems are implemented through the use of regional servers where local customers can access and request content available on the regional server used to service the customer, e.g., the regional server closest to the customer, but not other regional servers. In such a system, each of the regional servers will normally include some content which is common to all the regional servers, e.g., the latest movie releases, and some local content, e.g., recent local news shows, which may be available only from the regional server corresponding the area to which the local regional news show corresponds. The potential return for including the same set of local content on all the regional servers may not be justified given that there may be very little interest or demand for a regional east coast news show on the west coast for example. Similarly, the cost of storing a very large number of titles at all regional servers for long periods of time in a system may not be justifiable given the data storage costs.

Thus, it should be appreciated that continuously adding storage to every video server at every location in a system fails to become cost justified particularly with regard to content that may be requested relatively infrequently. The data storage upgrades can be expensive and there is an impact to the divisions/regions that perform the update in the terms of potential systems errors whenever the system hardware is updated/changed.

While content is one key to success in implementing an on-demand content service, just adding additional titles to a content store of a system is not guaranteed to directly translate into increased system use, e.g., content sales. For additional content to add value, it is important that the potential customers be able to easily find and order the content the user finds interesting in and easy manner.

As the available content increases, it places ever greater constraints on the user interfaces via which subscribers order content. Typical user interfaces for VOD systems are TV based navigational interfaces with the user navigating through menus and entering limited amounts of text using a TV, set top box, or other type of remote control. In addition to input constraints corresponding to the use of a remote control as the primary input device, TV based user interfaces are further limited by the problem of relatively low television resolution. The low resolution results in limitations on menu presentation. Further limitations may be the result of other constraints corresponding to limitations corresponding to previously deployed equipment which may be limited by hardware or communications protocol constraints particularly in the case of set top box based systems where it may not be practical to replace a large amount of previously deployed equipment.

Accordingly, increasing the amount of content available via a content delivery system, e.g., a system including VOD capability, has two major impacts, i.e., a client user interface impact and a content storage impact.

From the above discussion it should be appreciated that regardless of the protocol or type of network connection used to deliver content, e.g., video, on demand, several problems exist when trying to provide users access to a large amount of content particularly when the users of the service are geographically dispersed, e.g., located in different regions throughout the country.

Thus, there are at least two aspects of a content delivery system where there is a need for improvement. The first area is data storage requirements, e.g., the amount of data storage needed to support a wide number of VOD titles. The second area where there is a need for improvement is the user interface, e.g., the portion of system interface through which a user may identify available titles and/or order content.

SUMMARY OF THE INVENTION

The present invention is directed to methods and apparatus for supporting services requiring content delivery and, more particularly, on-demand content services, e.g., Video-On-Demand (VOD) services, music delivery services, etc.

Various aspects of the invention are directed to a novel use of content servers, e.g, in a hierarchical fashion, to facilitate delivery of content. The content server arrangement may be used alone, e.g., to deliver time critical content and/or content of short term interest or may be combined with one or more user interfaces to provide an on-demand delivery service. For example, the content server arrangement can be used to distribute movie releases, sporting events or other videos in a relatively short amount of time making it possible for a small or specialized content provider to supply content, e.g., video of a sporting event, and obtain wide, e.g., national, distribution of the content subject to rights, usage and/or time restrictions specified by the content provider or by agreement. The content provider may be compensated for viewing of the content as provided for in an agreement or otherwise. For example, the content provider may be compensated based on the number of orders received for a sporting event or movie.

In accordance with various aspects of the invention, a plurality of regional servers are interconnected. Servers may be arranged in a hierarchy with national or other server being connected to, and used for distributing content to, the individual regional servers. The server or servers in the hierarchy above the regional content servers, e.g., the national content server, can be described as multi-regional content servers since it is used to provide content to multiple regions, e.g., to the regional content servers serving different regions. Thus one or a few national servers may be positioned at the top of a hierarchy of content delivery servers. In a two level hierarchy system used in some embodiments, regional servers provide content to on-demand customers, e.g., subscribers. In other embodiments local servers which obtain content from regional servers provide the content to subscribers. Service subscribers may be, e.g., cable service subscribers who may order content and have it delivered to their set top box for display on a television connected to the set top box. However the content distribution system and features of the invention are not limited to cable applications.

A content distribution control apparatus, e.g., control module which may be implemented on a server, keeps track of content which is available from the various content servers in the system and can control the communication of content from one server to another. While the control apparatus may be implemented on a separate server, the control function may be implemented in one of the content servers or even implemented in a distributed manner with different modules which form the control system operating together but being located on different servers in the system. In some embodiments distribution of content is normally performed between servers at the top of the server hierarchy and servers lower down in the hierarchy. In one such embodiment, servers higher in the hierarchy contain larger content stores than servers lower in the hierarchy. For example, regional servers may contain the top 100 most popular on-demand movies and some regional content while the national content server may store thousands of titles some of which are expected to be viewed relatively infrequently along with content corresponding to multiple regions. Regional and/or other content may be uploaded from the regional servers to the national servers for distribution, e.g., in response to customer requests for regional or other content not already available on the regional server which provides content to the requesting customer's premises.

While hierarchal content distribution has many advantages, content may be exchanged between regional severs. For example, in some cases a shorter communications path may exist between a first regional server which contains content being ordered and a second regional server which services a subscriber requesting content which, at the time of the request, is not available on the second regional server. Accordingly, in some embodiments when content is to be delivered to a regional or local server so that it can be supplied to a requesting subscriber, the content distribution apparatus determines the location or locations of the content on servers in the system and then estimates the delivery time associated with delivering the content to the server which is used to supply content to the requesting subscriber's customer premise equipment. The content distribution apparatus can then select the most desirable content delivery path, e.g., selecting the content source to be the server with the shortest delivery time or, alternatively, the lowest delivery cost to the system provider. For example, delivery via connections dedicated or owned by the service provider may be preferred over third party communications paths even though the alternative paths may have a shorter delivery time. Accordingly, various embodiments of the invention support least cost path routing as part of the content delivery process.

In other embodiments, distribution of content is limited to a hierarchical approach with the higher level content servers providing content from, or supplying content to, content servers lower down in the hierarchy. Such a system may be easier to implement and manage than a system which also supports peer to peer content distribution between content servers at the same level in the hierarchy assuming the links between the servers in the hierarchy have sufficient bandwidth to support the distribution needs of the system.

In accordance with various features of the invention, storage at the regional or other lower level servers is managed as including a long term content store and a short term or temporary content store. Frequently ordered titles, e.g., movies or other content, are stored in the long term portion of the regional and/or lower level content servers. Less popular content, e.g., content supplied from a national or higher level server in response to a specific customer request for content not already present in the regional or local content server is normally stored in the temporary content store with a removal deadline being associated with the stored content. Content expected to be of interest for a relatively limited time, e.g., a copy of a live or recent sporting event, is also normally stored in the short term content store of the regional and/or local content servers with the content being deleted at the expiration of a set time, e.g., a time specified by contract with the sporting event content provider or a time based on the last request or purchase of the particular piece of content.

Using the above described content distribution system, a sporting event or other provider can upload content for distribution, e.g., to a regional server. The content can then be distributed by way of a national or other higher level server so that distribution on a national or multi-regional basis can occur in a synchronized manner without the content provider having to address distribution issues. Because, in some embodiments the distribution is via a cable network, it can be relatively secure and the content provider can expect that any content distribution constraints agreed to will be honored.

The above described system also provides for a scalable approach to providing subscribers to vast amounts of content in a cost effective manner since infrequently requested content need not be stored for long periods of time on regional or local content servers. Thus the methods and apparatus of the invention provide a scalable approach to the providing content to subscribers where the data storage capabilities of the local or regional content servers need not be updated even as the number of titles to which the subscribers may be provided access grows since the growth can be accommodated by increasing the storage capacity in the national or other high level content servers as opposed to the local or regional servers.

While some aspects of the invention are directed to content storage and supplying content in a manner that allows a wide range of titles to be supported with manageable storage requirements, other aspects of the invention are directed to methods and apparatus for allowing a subscriber to obtain access to content in a reasonable and convenient manner.

The user interface features, methods and apparatus of the invention are not limited to being applied in a system using content servers as described in various embodiments of the invention but is particularly well suited for use with such server arrangements.

In accordance with various aspects of the invention, a user is provided access to content through a web based interface. This permits a customer to search and select titles with the benefits and advantages of a full function computer keyboard, mouse and computer display screen for input of search information and selection of particular content to be selected. In various embodiments text searching by title, director, movie category, artist, actor, movie date, etc. are supported. The customer may drag items to be ordered into a play list or other list of titles which the customer is ordering. In some embodiments the order is processed as a request that the title be made available and the client is not billed until the customer later confirms the order by starting the download of the content, e.g., to a set top box. In other embodiments the selection of a title and addition to the customer's play list results in the order being immediately billed. Thus, for purposes of discussion a request for a particular title is a type of order. However, the request may or may not be billed at the time of the initial order depending on system rules. In some embodiments, the billing occurs when the content is actually delivered to the subscriber's customer premise equipment. By allowing a subscriber to order content via a Web based interface, e.g., using a web browser application running on a personal computer, the subscriber is provided a much greater degree of flexibility in searching for and selecting content than is possible using a standard set top box interface.

In accordance with one feature of the invention, subscriber rental and/or play lists are maintained for individual subscribers. The maintained lists are automatically updated in response to the subscriber making a change to one of the lists either via a STB interface or Web Interface. Accordingly, changes made via the Web Interface will be reflected when the subscriber views the list using the STB interface. Similarly, changes made via the STB interface will be reflected in the lists presented when accessing the lists via the Web Interface.

In response to the subscriber requesting a title, e.g., particular content, the location of the content in the system is determined. If the content is available locally, e.g., on a regional content server, the subscriber can download the content immediately, e.g., via the subscriber's set top box. However, in cases where content is not on a content server from which the content can be delivered directly the subscriber's customer premise equipment, the time required to delivery the content is estimated and the subscriber is notified of the estimated delivery delay. In some embodiments, the user can select to be notified when the content becomes available, e.g., has been loaded onto the content server, e.g., a local or regional content server, used to provide, e.g., stream, the content to the customer's premises. The notification can be by E-mail, a pop-up notification window generated by the set top box and/or though an SMS text. The notification feature is an optional convenience feature which is useful to clients seeking to conduct other activities while waiting for the content to be made available.

Once the content is available, the customer can initiate the delivery of the content to the subscriber's customer premise equipment, e.g., set top box or other device. In some embodiments, the billing information is updated in response to the subscriber triggering the actual downloading or streaming of the content.

By providing a customer the opportunity to search and order content via a web interface in addition to through the conventional set top box interface, subscribers are provided a meaningful way to access and search though large libraries of content without being subject to the constraints of the set top box interface while at the same time still being able to use the set top box based interface to order content where a web based features are not required. In addition, by adding the Web based interface while still supporting the set top box interface, customers who do not have a personal computer, web device, or Internet access can continue to order content albeit without the advantages offered by the Web based interface. Thus, the addition of the Web interface/portal adds features and simplifies access to large amounts of content without having a negative impact on users content with the existing STB interface.

Various additional features and advantages of the present invention are discussed in the detailed description which follows.

BRIEF DESCRIPTION OF THE DRAWINGS

FIG. 2 which comprises the combination of FIG. 2A

FIGS. 6A-6F illustrate various user interface features and options made available to a service subscriber, e.g., VOD customer, in accordance with various embodiments of the invention.

DETAILED DESCRIPTION

As discussed above, the present invention is directed to methods and apparatus for supporting services requiring content delivery and, more particularly, on-demand content services, e.g., Video-On-Demand (VOD) services, music delivery services, etc.

The methods and apparatus of the invention can be used in combination with, or to improve upon content delivery methods and systems such as those described in U.S. patent application Ser. No. 11/079,958, titled "Technique for Providing on a Program Channel Composite Programming Content Attributed to Different Sources" which is hereby expressly incorporated by reference.

Figure 1:
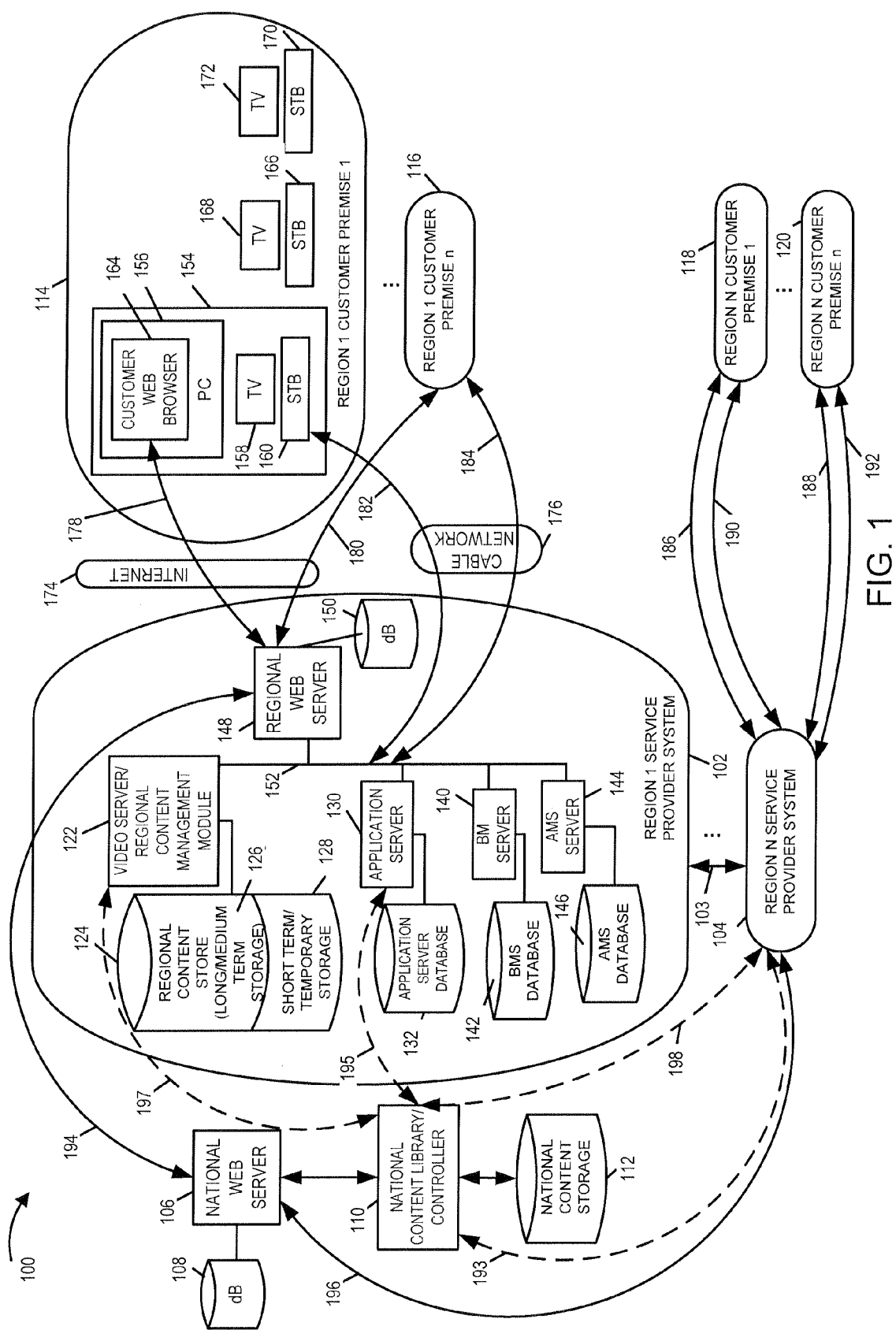
FIG. 1 illustrates an exemplary content delivery and distribution system implemented in accordance with the present invention.

FIG. 1 is a drawing of an exemplary content delivery and distribution system 100 supporting the provisioning, selection, notification, communication, and billing of content, e.g., content including video on demand (VOD), to customers in accordance with various embodiments of the present invention. Exemplary system 100 includes a plurality of regional service provider systems (region 1 service provider system 102, . . . , region N service provider system 104). Each regional service provider system (region 1 service provider system 102, region N service provider system 104) has a corresponding set of customer premises ((region 1 customer premise 1 114, . . . , region 1 customer premise n 116), (region N customer premise 1 118, . . . , region N customer premise n 120)). System 100 also includes service provider national infrastructure including a national Web server 106 with a corresponding database 108 and a national content library/controller 110 with corresponding national content storage 112.

Region 1 customer premise 1 114 includes a first set of equipment 154 including a personal computer 156, a television 158 and a set top box 160. Personal computer 156 includes a customer Web browser 164. Region 1 customer premise 1 114 also includes additional television/set top box pairs (168/166, 172/170). Some customer premises include at least one set top box and at least one television. Some customer premises include at least one device supporting a customer Web browser. At least some customers in the system 100 have accounts with the service provider which can be accessed via a Web browser, situated at the same location or a different location from the customer's set top box, and input/output interfacing performed via the Web browser can affect content availability via the customer's set top box interface.

Region 1 service provider system 102 includes a regional Web server 148, a video server/regional content management module 122, an application server 130, a business management (BM) server 140 and an AMS server 144. Region 1 service provider system 102 also includes a plurality of various databases (regional web server database 150 coupled to regional web server 148, regional content storage 124 coupled to video server/regional content management module 122, application server database 132 coupled to application server 130, business management server database 142 coupled to BM server 140, and AMS database 146 coupled to AMS server 144. The various servers (122, 130, 140, 144, 148) are coupled together via a bus 152 over which they may interchange data and information.

Region 1 customer premise 1 114 is coupled to region 1 service provider 102 via the Internet 174 and via cable network 176. Communications link 178 traversing the Internet 174 couples customer Web browser 164 to regional Web server 148. Communications link 182 traversing the service provider's cable network 176 couples set top box 160 to the region 1 service provider's bus 152. Similarly, region 1 customer premise n 116 is coupled to regional Web server 148 via link 180 which traverses the Internet 174; region 1 customer premise n 116 is coupled to region 1 service provider system bus 152 via link 184 which traverses service provider cable network 176.

Region N customer premise 1 118 is coupled to region N service provider system 104 via an Internet link 186 and a cable network link 190. Similarly, region N customer premise n 120 is coupled to region N service provider system 104 via an Internet link 188 and a cable network link 192.

Region 1 service provider system 102 is coupled to region N service provider system 104 via link 103. Each of the regional service provider systems (102, 104) are also coupled to the national Web server 106 and national content library/controller 110. Link 194 indicates that regional Web server 148 is coupled to national Web server 106. Similarly, link 196 indicates that region N service provider system 104 has a Web server which is also coupled to national Web server 106.

National content library/controller 110 is coupled to video server/regional content management module 122 and application server 130 via links (197, 195), respectively. Similarly national content library/controller 110 is coupled to a video server/regional content management module and an application server of region N service provider system 104 via links (193, 198), respectively. Various alternative interconnection topologies between the regional service provider system and the national service provider infrastructure are possible.

National content storage 112, typically has a greater storage capacity than the storage capacity of an individual regional content storage, e.g., region 1 regional content storage 124. Regional content storage 124 includes long/medium term storage 126 and short term/temporary storage 128. Long/medium term storage 126 includes, e.g., content storage of programs such as movies for which there is a high degree of anticipated demand. Long/medium term storage 124 includes, e.g., content of recent releases, content of regional favorites, content of seasonal favorites, etc. Short term/temporary storage 128 includes storage of content of infrequently selected programs which do normally reside in storage 124, e.g., a customer ordered video on demand infrequently selected movie that has been recently downloaded from national content storage 112. Short term/temporarily storage 128 also includes storage of time sensitive programs, e.g., a recent weather report, a recent news report, etc. Individual program content stored in short term/temporary storage 128 may, and sometimes does, have a cache time associated with maintaining the program content.

Customer web browser 164 which interacts with regional Web server 148 supports customer access to service provider program content availability information, customer ordering of content, reporting of status of ordered content, and customer account management functions. For example, via customer Web browser 164 a customer may view lists, information, menus, trailers, etc. of available content, initiate searches based on key information, view search results, select a video on demand program, place an order for the selection, receive an indication of an approximate time of availability for viewing, and receive an indication, e.g., a notification message and/or an E-mail, when ordered content is available for viewing.

Regional Web server 148 interacts with a plurality of customer Web browsers and with national Web server 106. Regional web server 148 performs secure log-ins of customers, accesses customer information in its database 150 and stores customer information in its database 150. Database 150 information includes, e.g., sets of information corresponding to individual customers. For example a set of customer information includes user identification information, a password, information identifying customer preferences, customer ordering and/or viewing history information, pending customer order information, and customer program availability information such as a play menu corresponding to a set top box interface play menu. Regional Web server 148 receives orders for content, determines if the selected content is locally available in store 124, and forwards requests for content not currently in region 1 store 124 to national Web server 106.

National Web server 106 interacts with the regional Web servers, e.g., regional Web server 148, and the national content library/server controller 110. For example, national Web server 106 receives customer program orders for content relayed from regional Web server 148 and forwards the request to national content library/controller 110 along with information identifying the regional store to which the requested content is to be directed. National Web server 106 also forwards content delivery time estimation information and/or content delivery information received from national content library/controller 110 to regional Web server 148.

National content library/controller 110 calculates estimated delivery time for requested content, e.g., based on system topology information, network metrics and/or historical data transfer rates. In some embodiments national content library/controller 110 tracks content storage of at least some information in regional stores and considers a transfer between regional stores as an alternative to a transfer from national content storage 112 when responding to a request for content not currently available at a customer's corresponding regional content store. National content library/controller 110 processes requests for content and accesses content from national content storage 112, e.g., forwarding requested content via link 197 to video server/regional content management module 122 for storage in short term storage 128 of regional store 124. The national content library/controller 110 also communicates information, via link 195, such that the application server 130 can update the application server database, at the appropriate time, identifying that the requested content, e.g., ordered movie, has been loaded in the regional store and is now available for ordering, e.g., purchase, by a customer via the set top box interface. For example, application server 130 updates a current rentals list stored in database 132 corresponding to the customer, the current rentals list used by the set top box user interface.

Video server/regional content management module 122 manages regional store 124, e.g., loading a copy of an externally stored program into short term/temporary storage 128 and outputting customer ordered and/or purchased content for delivery to a set top box. The externally stored program content, which was copied, is, e.g., stored in national content store 112. Other functions performed by video server/regional content management module 122 include deleting and/or not maintaining content accessibility in response to a received command, a timer expiration, and/or a determined low request rate of a stored program.

Application server 130 stores and maintains current rental lists corresponding to the region 1 customers, said lists being available for set top box user interfaces. Application server 130 also publishes the metadata, e.g., short and long descriptions corresponding to content packages, and pricing details into categories on virtual channels.

Business management server 140 processes billing information corresponding to region 1 customers, e.g., updating billing charge information in response to video on demand purchases. Business management server 140 also processes bill payment information, e.g., credit card transactions, deductions from debit accounts, mail bills, and/or processes discount and/or coupon information.

Figure 2B:
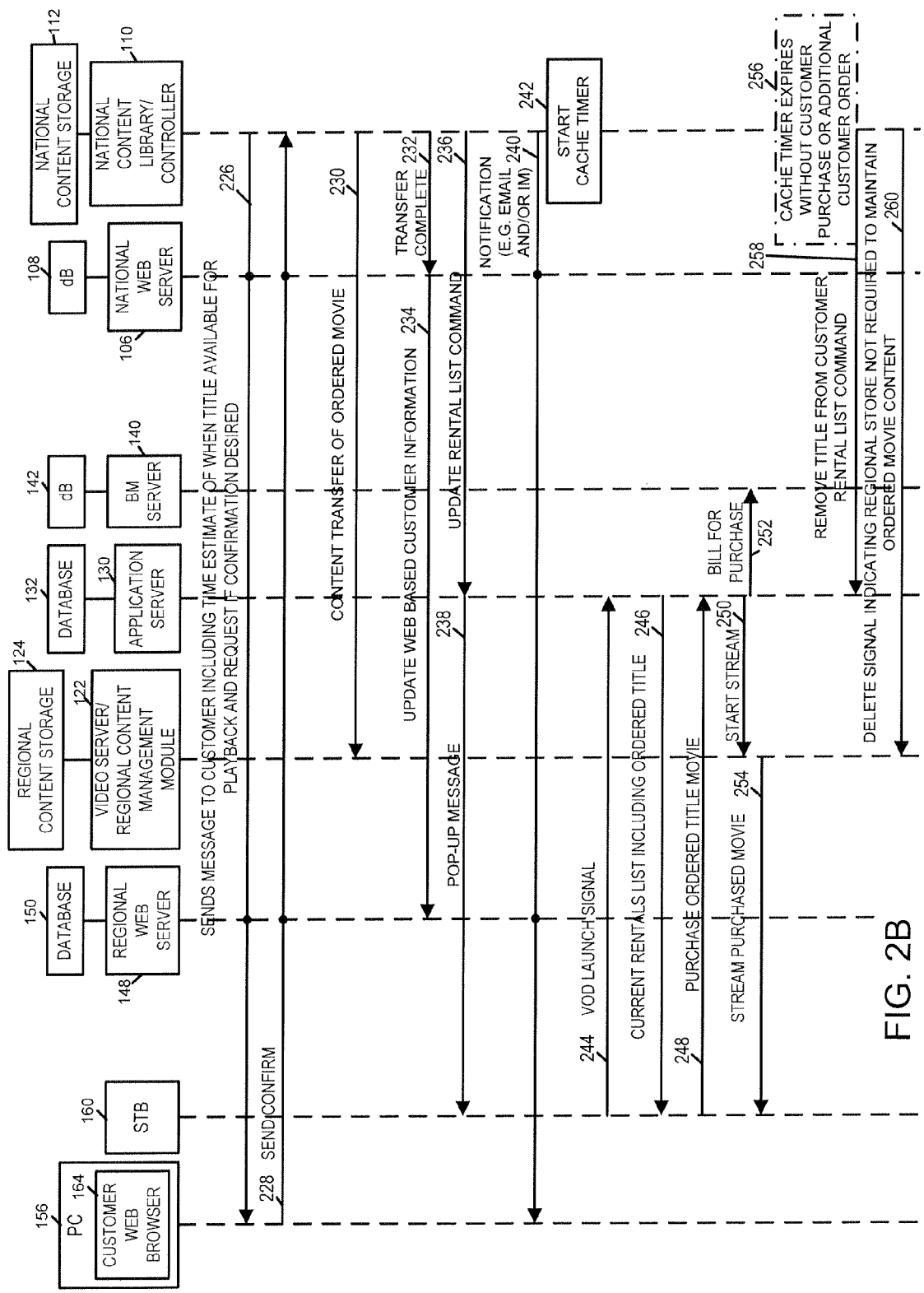
FIG. 2B illustrates various exemplary signaling, processing, and interactions in an exemplary content delivery and distribution system including operations of selecting, ordering, purchasing and delivering content.

FIG. 2 comprising FIG. 2A and FIG. 2B is a drawing 200 used for describing various exemplary signaling, processing, and interactions in content delivery and distribution system 100 including the operations of selecting, ordering, purchasing and delivering content. A customer operating personal computer 156 accesses customer Web browser 164, and connects to the Web address corresponding to the Regional Web server 148 as indicated by signal 202. The regional Web server 148 provides link options to the customer as indicated by signal 204. The customer selects a video on demand link, and the selection is communicated by signal 206 directed from customer Web browser 164 to regional Web server 148. A login is performed as indicated by signaling 208 exchanged between the customer Web browser 164 and regional Web server 148. The login includes, e.g., a username and associated password being communicated and verified, the username and password corresponding to an account representing one or more of the set top boxes within the customer's home. The regional Web server 148 uses stored information in its database 150 to verify the username and password and then retrieve customer account information, e.g., profile information corresponding to the identified user as indicated by block 210. The user is presented with content availability menus and information as indicated by signaling 212. Various presentations include, e.g., browsing features, search features, summaries by content category, summaries by provider, short descriptions, long descriptions, video clips, trailers, pricing information, recommendations, new release information, and summaries based on demand. In some embodiments, the regional Web server 148 obtains at least some of the presented information via the application server 130 and/or the BM server 140. The user may navigate through various menus which present information about a vast library of content available for viewing including content which is available from a national content store.

The use of a Web interface for presenting available content offers a higher degree of flexibility in the presentation than would otherwise be possible if a typical set top box interface had been used for the content availability presentation. Alternatively, or in addition, in some embodiments, the set top box interface can be used to search the vast amount of available content including content in the national content store and place orders, but using a more primitive interface with fewer features than is available if the Web based interface is used.

The customer places an order for a movie via the customer Web browser 164 and customer movie order signal 214 is generated and sent to regional Web server 148. The regional Web server 148 sends signal 216 to video server/regional content management module 122 to check if the requested movie is currently available from the regional content store 124. In this particular example, the requested movie is not available from the regional content store 124, so the video server/regional content management module 122 sends a signal 218 informing the regional Web server 148 that the movie is unavailable.

Then, the regional Web server 148 sends signal 220 to the national Web server 106 forwarding the customer movie order. The national Web server 106 sends signal 222 to national content library/controller 110 forwarding the customer movie order plus information including delivery location information associated with the placed order.

The national content library/controller 110 calculates delivery time based on destination, alternative potential sources, network metrics and historical data transfer rates, as indicated by block 224. At some times the requested content, e.g., the requested movie, resides at multiple locations in the system 100. For example, a request movie may reside in the national content store 112 and in a regional content store which is in a different region than the region in which the customer resides. For some requests, the national content library/controller 110 may determine that requested content can be delivered quicker by controlling the transfer of the requested content from one regional content store to another regional content store rather than by transferring content from the national content storage 112 to the customer's regional content store.

In signal 226 which is sent from national content library/controller 110 to customer Web browser 164 via national Web server 106 and regional Web server 148, a message is sent to the customer communicating a time estimate of when the requested title is expected to be available for playback and requesting whether or not the customer would like confirmation. For example, the message may be "Movie titled (insert ordered title) will be delivered in (insert estimated number of minutes) minutes and will be available until (insert date and time in format MM/DD/YY HH:MM). Would you like an email confirmation (Y/N)?" The date/time in the message indicates an end of cache period in which the ordered movie may be, and sometimes is, scheduled to be deleted from the temporary storage in regional content storage 124. In this example, the customer decides that a confirmation is desired, and request confirm signal 228 is sent from customer Web browser 164 to national content library/controller 110 via regional Web server 148 and national Web server 106.

In this example, consider that the national content library/controller 110 has determined to perform a content transfer from the national content storage 112 to the regional content storage 124. For example, the requested content is currently available in the national content storage, but not in any of the regional content storages. Alternatively, the requested content may reside at both the national content store 112 and at least one other regional content store; however, the national content library/controller 110 has determined that is advantageous, e.g., from a time delivery standpoint and/or cost of delivery standpoint, to communicate the information from the national content storage 112 to the regional content storage 124.

Signals 230 indicate that a copy of the content corresponding to the ordered movie is transferred from the national content storage 112 to the regional content storage 124. Upon completion of the transfer, the national content library/controller 110 sends a transfer complete signal 232 to the national Web server 106 which sends signaling 234 to regional Web server 148 to update Web based customer information. For example, the regional Web server 148 updates a stored list corresponding to the customer to incorporate the added title. National content library/controller 110 also sends signal 236 to application server 130 notifying the application server 130 to update a rental list to incorporate the ordered title movie. As an alternative, in some embodiments, one of the national web server 106 and regional Web server 148 signals the application server 130 with information to update the application server's database 132 so that the ordered title will appear in the current rentals category corresponding to the customer. The application server 130 sends a pop-up message to the set top box 160, via signal 238, which indicates that the ordered movie is now available for viewing. In addition, national content library/controller 110 sends a notification signal 240, e.g., an E-mail and/or instant message, to customer Web browser 164 via national Web server 106 and regional Web server 148, notifying the customer that the ordered movie is now available for viewing.

The national content library/controller 110 starts a cache timer associated with the delivered requested content now residing in regional Web server 148, as indicated by block 242.

Signal 244 from set top box 160 to application server 130 indicates that the customer has sent a video on demand launch signal. In response, the application server 130 sends signal 246 communicating a current rentals list including the ordered title corresponding to the movie order of signal 214. The customer decides to purchase the ordered movie and signal 248 from set top box 160 to application server 130 communicates the indication to purchase. The application server 130 signals the video/server regional content management module 122, via signal 250, to start streaming the purchased movie content to set top box 160. In addition, the application server 130 signals the business management server 140 to bill the customer for the video on demand movie purchase via signals 252. The video server/regional content management module 122 accesses regional content store 124 and streams the purchased movie as indicated by signals 254 to set top box 160.

Consider, now alternatively, that the customer has not sent a purchase command signal 248 corresponding to the ordered movie title and that another customer in the same region has not ordered the same movie, and that the cache timer has subsequently expired, as indicated by block 256. Then, the national content library/controller 110 sends signal 258 to application server 130 notifying the application server 130 to remove the title from the customer rental list. In addition, the national content library/controller 110 sends a delete signal to video server/regional content management module 122 indicating that regional content storage 124 is not required to maintain the ordered movie content whose cache timer has expired.

In various embodiments, the customer connects to and interfaces through a national Website as opposed to a regional Website. In some such embodiments, at least some of the described functionally performed by the regional Web server is incorporated into the national Web server. In various embodiments, various Web servers in the communications system are linked such as to provide a seamless user experience, e.g., the user is unaware and/or unaffected by whether one or more functions are being performed by a regional Web server or a national Web server.

In some embodiments, distribution of content from a national content storage to regional content storage and/or between different regional content storage locations is via a private, e.g., corporate, communications network.

Figure 3A:
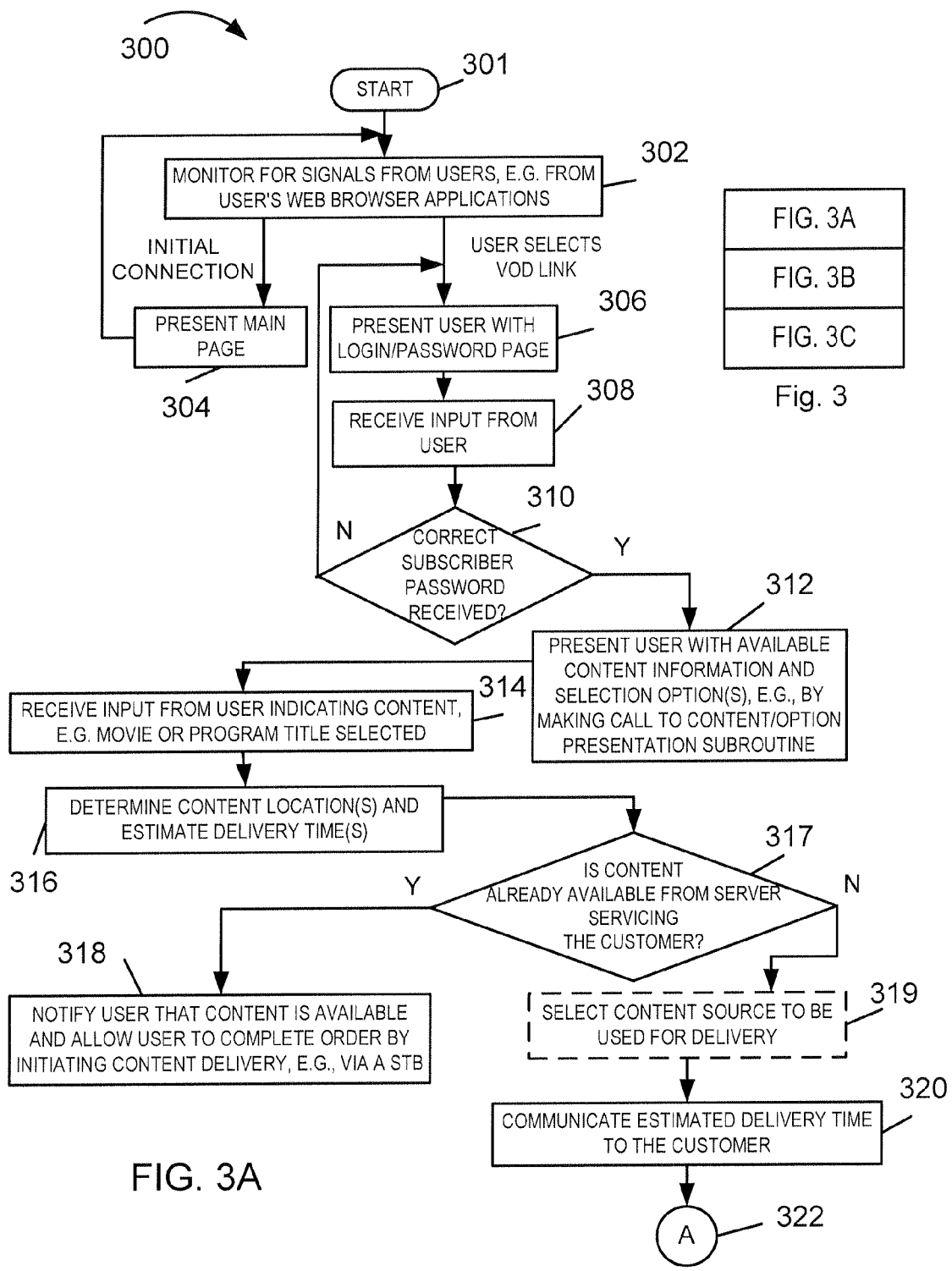
FIG. 3 which comprises the combination of FIGS. 3A, 3B and 3C illustrates the steps of a content delivery method implemented in accordance with the invention with optional notification of content when it becomes available.
Figure 3B:
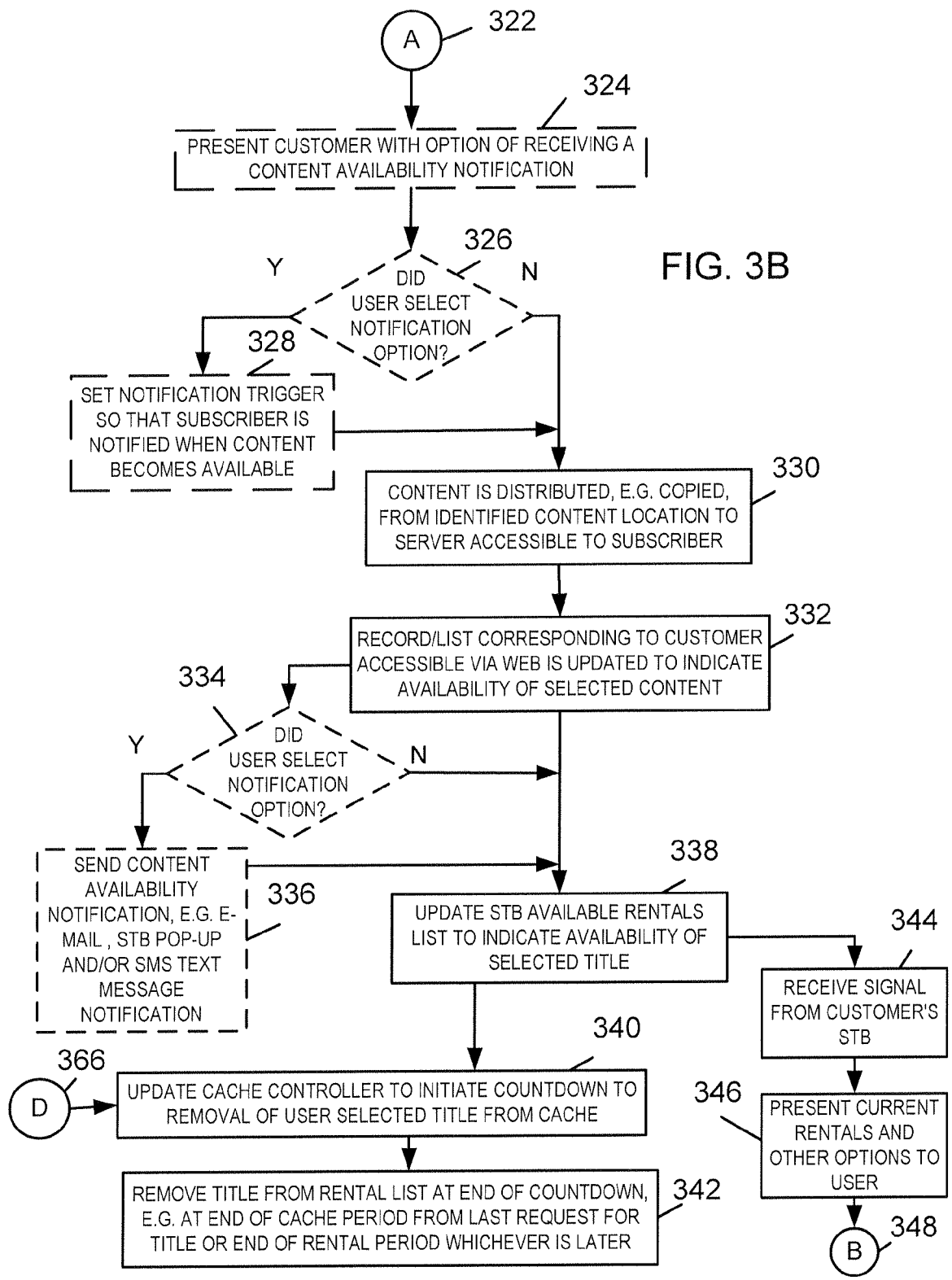
Figure 3C:
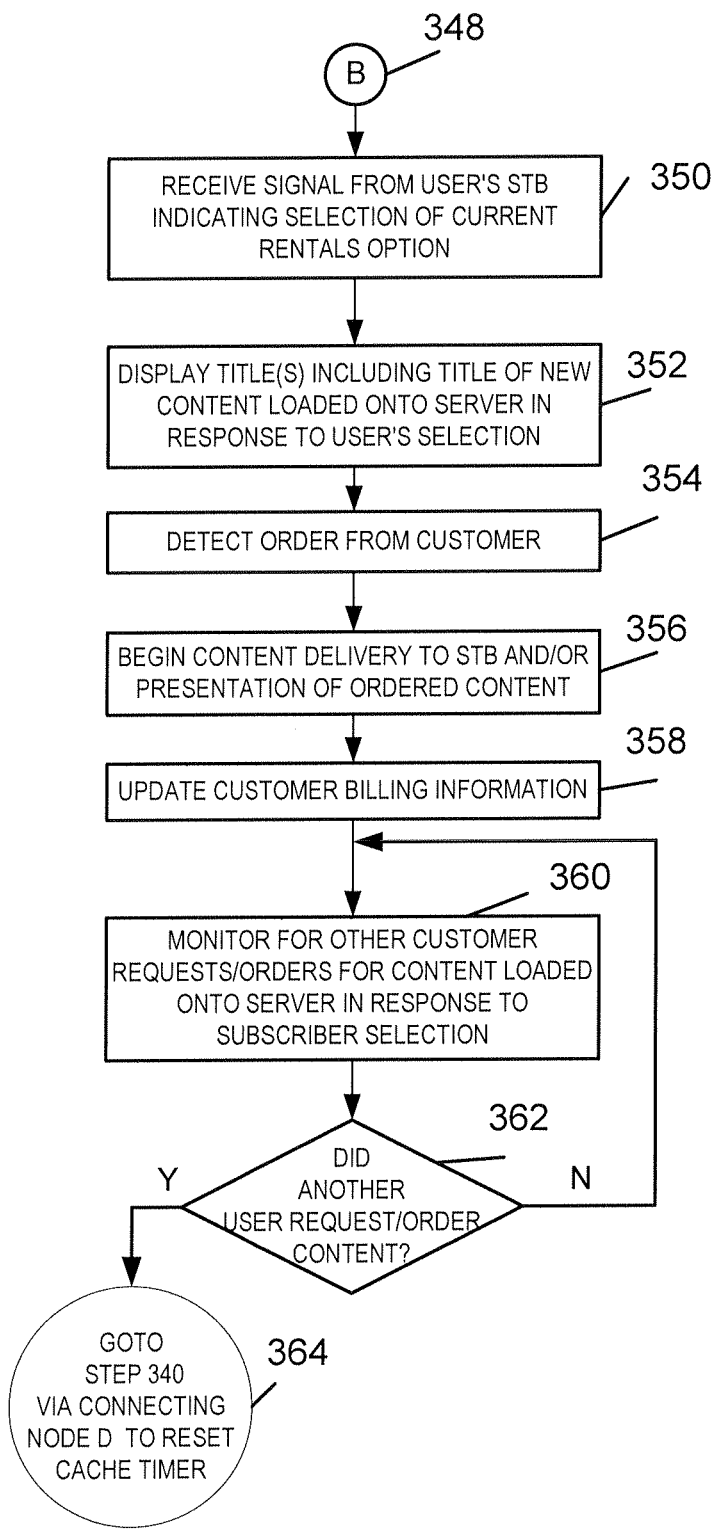
Figure 4A:
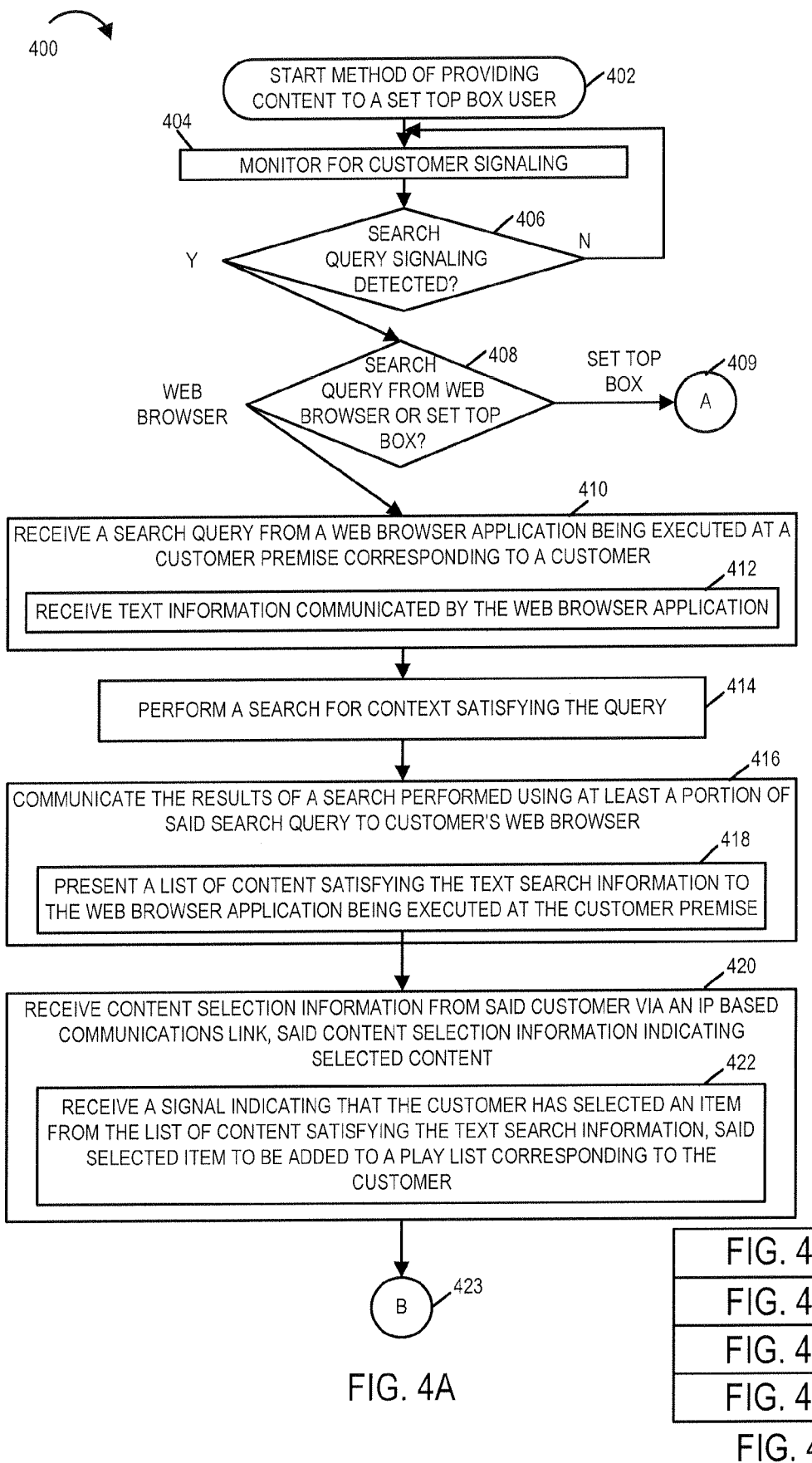
FIG. 4 which comprises the combination of FIGS. 4A, 4B, 4C and 4D illustrates the steps of another exemplary content delivery embodiment of the invention wherein content can be made available on demand to a user being serviced by a server which does not have the content immediately available at the time the user expresses interest in the content.
Figure 4B:
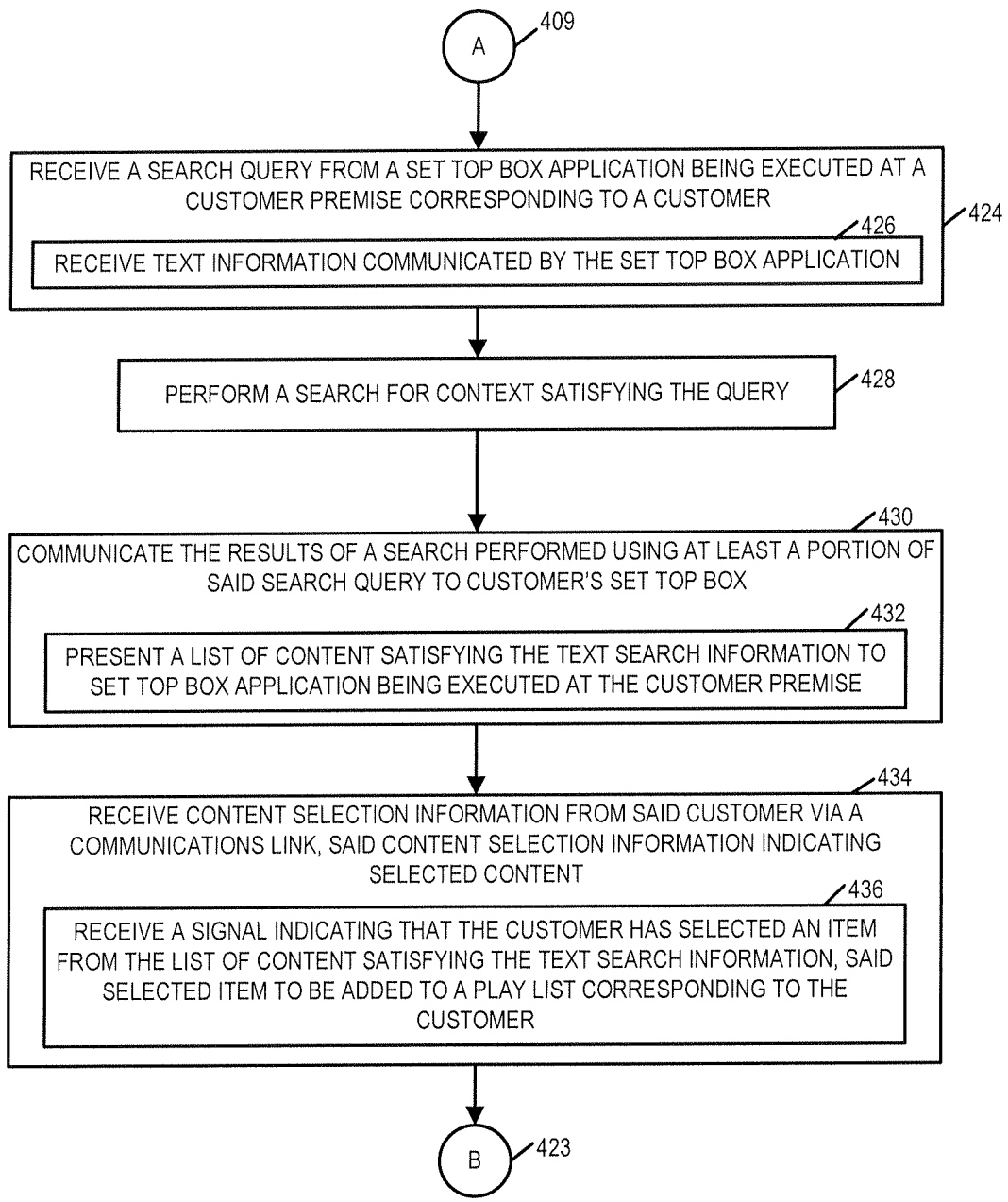
Figure 4C:
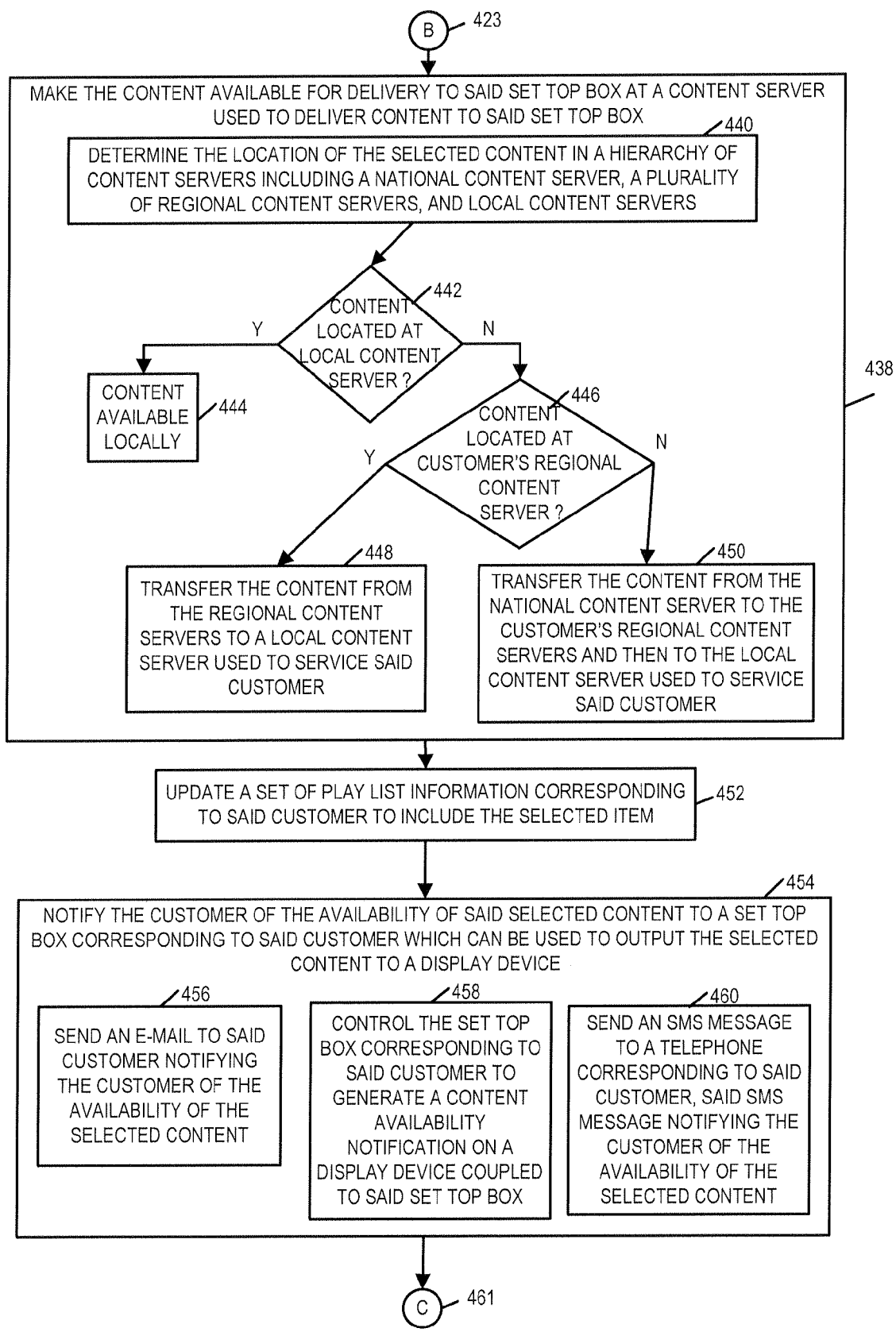
Figure 4D:
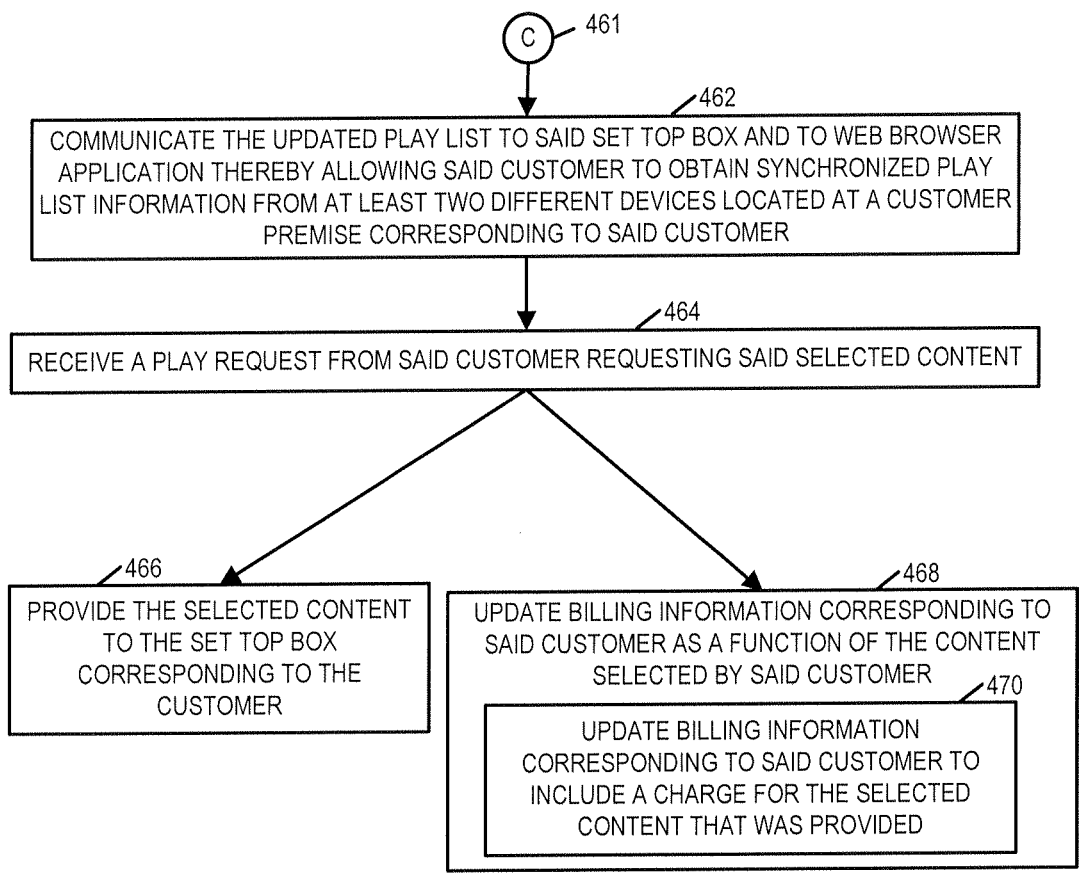

FIG. 3 illustrates the steps of a method 300 of providing content, e.g., video content such as a movie, in accordance with one embodiment of the invention wherein the content distribution is controlled using a plurality of distributed elements working together as a content distribution control apparatus. The discussion of the method 300 will focus primarily on the case where a user selects content that is not available in the regional or local content store which is used to supply, e.g., stream, content to the user's customer premises. This case is the more useful one in understanding the invention since it involves content transfer between content servers as compared to the case where the content is available on the local or regional server and is immediately available to the customer.

The method 300 begins in start step 301 and proceeds to step 302 wherein a server, e.g., regional web server 148, monitors for signals from users, e.g., signals from user's web browser application(s) which may be received via the Internet. In step 302 if a signal indicating an initial connection is received, operation proceeds to step 304 wherein the user is presented with a main page which includes, among other things, a video on demand link, e.g., in the form of a link, e.g., VOD button, which can be selected by the user. Assuming the user selects the VOD link from the user's web browser by, e.g., clicking on it, the user's web browser will send a signal to the web server 148 indicating selection of the VOD link. If in step 302, the signal from user's Web browser is determined to be a VOD link selection signal, operation will proceed to step 306 wherein the web server 148 presents the user with a login/password page.

In step 308, the web server 148 receives input from the user and then in step 310 checks if the user has provided the correct password. If the password provided is incorrect operation returns to step 306 wherein the user is provided an opportunity to renter the user name and password. Assuming the subscriber entered a valid user name and password, operation will proceed from step 310 to step 312. In step 312, the web server 148 presents the user with available content information and selection options. Operation then proceeds to step 314 wherein the web server receives input from the user indicating the content, e.g., movie or program title, the user selected.

The location or locations where the requested content is in the system is then determined and the delivery or delivery times estimated in step 316.

This may involve the web server 148 communicating the content selection information to the national content library controller 110 which then determines the location or locations, e.g., servers, in the system where the content is located. Once the location or locations of the content is determined, the delivery times for delivery from the identified locations to the server which is responsible for supplying content to the user's customer premises is determined. In the case where the regional or local server servicing the customer does not have the content available, it may be determined that another regional server can supply the content in less time than the national server.

In step 317 a determination is made as to whether or not the content is available from the local or regional server used to supply content to the user. If the content is already available, the customer is so notified in step 318, and the user can proceed with the rental, e.g., via the STB. However, if the content is not already available, operation proceeds to step 319 where the various sources of the content are considered. In the case where there is more than one location for the content, in step 319 the content source to be used for delivery is selected. This selection process is normally based on the estimated delivery time determined in step 316 with the content source having the shortest delivery time being selected. However, in some embodiments in step 319 the cost of delivering the content, in terms of network charges, is taken into consideration. Thus in some embodiments in step 319 a content source may be selected which has a longer delivery time because the cost, e.g., monetary or other charges, associated with the communications links from the server which has the content and the local or regions server responsible for supplying the content to the customer's premises is lower. For example, links between servers owned by or dedicated to the VOD provider may be less costly to use than links which must be paid for on a per use basis justifying a preference for use of the lower cost links even if it results in a delivery delay that is slightly longer. In some embodiments, a national content library controller 110 is used to determine the content locations, delivery times and to select the content source to be used for delivery as performed in steps 316, 317, 319.

The selection step 319 may be omitted or skipped when the there is only a single available content source or in cases where the default is to supply content from the national content store 112. With the delivery source having been selected, operation proceeds to step 320 where the customer is notified of the estimated delivery time. Operation proceeds from step 320 to step 324 via connecting node A 322 in cases where content availability notifications are supported or directly to step 330 when content availability notifications are not supported.

In step 324, the customer is presented with the option of receiving a content availability notification. The controller 110 may be responsible for communicating this option to the customer, e.g., via a web server, and for implementing various steps associated with this option. In step 326 a determination is made as to whether or not the user selected the notification option. If the notification option was selected operation proceeds to step 328 where a trigger is set so that the subscriber will be notified when the content becomes available at the server used to supply content to the customers CPE equipment, e.g., STB. Operation then proceeds to step 330. If in step 326 it was determined the user did not select to be notified, operation proceeds directly to step 330. In some embodiments controller 110 is responsible for setting and maintaining content notification triggers.

In step 330, the requested content is distributed, e.g., copied, from the selected content location and communicated to the server used to supply content to the customer's STB. The content is normally stored in the local or regional server's short term/temporary storage 128. With the copy to the server complete, the record and/or list corresponding to the web based interface corresponding to the customer which placed the order is updated to indicate that the ordered title is now available to the customer. This update may be initiated by controller 110. Operation proceeds from step 332 to step 338 via steps 334 and 336 in cases where availability notifications are supported and directly to step 338 in cases where availability notifications are not supported.

In step 334 a check is made as to whether the user selected the availability notification option. If the notification option was selected operation proceeds to step 336 otherwise operation proceeds directly to step 338 without a notification being sent. In step 336, the customer is notified via an E-mail, STB pop up message and/or by an SMS text message that the requested content is available for delivery. For this purpose an E-mail address, telephone number and/or STB identifier corresponding to the subscriber is stored as part of a customer record which is accessed by the Web server upon the subscriber login into the system. Operation then proceeds to step 338 where an update of the information used to indicate rental availability on the STB interface is made. Thus, in step 338 the list of rentals that will be displayed on the customer's STB is updated to match the list displayed via the Web interface with both lists indicating the requested title is now available for delivery.

Operation proceeds from step 338 to steps 344 and 340 along parallel paths. In step 340 a timer is set corresponding to the temporary data store in which the requested content is stored for delivery to the customer. This timer is set to cause the content to be removed from the temporary data store at the end of a cache period or a rental period, which ever is later. The cache period is a period for which the title will remain in the temporary storage absent a customer completing an order for the title after it is loaded into the temporary store or from the time the most recent order for the title was placed, whichever is later. The trigger for this period will be reset each time a customer completes an order, e.g., starts a download of the title. The rental period is a period for which the title is to remain available to a customer who has completed an order, e.g., by beginning to download the title. The rental period may be longer than the cache period in some cases. In step 342 the title is removed from the rental list at the end of the countdown set in step 340, i.e., at the end of the period used to control removal of the title from the temporary data store. Thus, it should be appreciated that steps 340 and 342 are temporary data store management steps used to control how long a requested title remains in the temporary store of a regional or local server. In some embodiments steps 340 and 342 and the removal of the content may be implemented under control of the content controller 110 which has knowledge of when the content was loaded and what, if any, orders for the content were placed.

In step 344, a signal is received from the customer's STB. In step 346 the customer is presented on the screen with a list of the current rentals which are available, including the ordered content, and various other options. This may be implemented under control of the application server 130. Operation proceeds from step 346 to step 350 via connecting node B 348. In step 350 a signal is received from the customer's STB indicating selection of the current rentals option. In response, the titles of the available rentals are presented to the user via the STB which causes the list to be displayed on the user's television screen. Next, in step 354, an order for the requested title is detected. This order may be placed by the user selecting the title corresponding to the requested content and initiating content delivery by pressing one or more remote control keys used to confirm the order and initiate content delivery. Next, in step 356 content delivery is initiated. The delivery may be triggered by application server 130 which can be used to implement steps 350, 352 and 354 with the content being streamed from the short term storage 128 of the regional content store 124 under control of the video server/regional content management module 122.

With the order confirmed and content delivery initiated, operation proceeds to step 358 wherein billing information corresponding to the customer is updated to reflect a charge for the content which was ordered and delivered. The billing operation may be performed by the business server 140 using information provided by one or more of the other servers, e.g., the application server 130. Thus, in the illustrated embodiment, the customer is not charged for the content until the customer confirms the order by initiating delivery to the customer's premises, e.g., with the content being delivered to the STB located there.

With the delivery of the content complete operation proceeds to step 360 wherein the system monitors for other customer request/orders for the content loaded onto the regional or local server in response to the customer's order. If in step 362 another order for the same content, from a customer serviced by the regional or local server onto which the content was loaded is detected, step 364 is performed in which operation proceeds to step 340 via connecting node D 366 to reset the cache and/or rental period so that the ordered title will remain in the temporary cache for a sufficient amount of time for the additional request and possibly other requests for the content to be serviced. The monitoring to detect additional orders for the content which may reset the timer used to control how long the content remains in the temporary cache will continue until the content is deleted, e.g., as a result of the timer corresponding to the stored content expiring.

FIG. 4 comprising the combination of FIG. 4A, FIG. 4B, FIG. 4C and FIG. 4D is a drawing of a flowchart 400 of an exemplary method of providing content to a set top box user in accordance with various embodiments of the present invention. The exemplary method of flowchart 400 is performed, e.g., by a content access server. In some embodiments, various steps of flowchart 400 are performed by different devices, e.g., different servers in a set of servers coupled together.

The exemplary method of flowchart 400 is started in step 402, where the content access server is powered on and initialized. Operation proceeds from start step 402 to step 404, in which the content access server monitors for customer signaling. Then, in step 406, the content access server checks as to whether or not a search query has been detected. If a search query has been detected, operation proceeds from step 406 to step 408. If a search query has not been detected operation proceeds to step 404 for additional customer signaling monitoring.

In step 408, the content access server determines whether the search query was from a web browser or from a set top box. If the search query was from a web browser, operation proceeds from step 408 to step 410; if the search query was from a set top box, operation proceeds from step 408, via connecting node A 409 to step 424.

In step 410, the content access server receives a search query application from a web browser application being executed at a customer service premise corresponding to a customer. Step 410 includes sub-step 410 in which the content access server receives text information communicated by the web browser application. Operation proceeds from step 410 to step 414. In step 414, the content access server performs a search for content satisfying the query. The search of step 414, in some embodiments, includes a search for content satisfying the query which is available from any one of a national content library, a regional content library, and a local content library. Then, in step 416, the content access server communicates the result of the search performed using at least a portion of said search query to the customers web browser. Step 416 includes sub-step 418, in which the content access server presents a list of content satisfying the text search information to the web browser application being executed at the customer premise. Operation proceeds from step 416 to step 420. In step 420, the content access server receives content selection information from said customer via an IP based communications link, said content selection information indicating selected content. Step 420 includes sub-step 422. In sub-step 422, the content access server receives a signal indicating that the customer has selected an item from the list of content satisfying the text search information, said selected item to be added to a play list corresponding to the customer. Operation proceeds from step 420 via connecting node B 423 to step 428.

Returning to step 424, in step 424, the content access server receives a search query from a set top box application being executed at a customer premise corresponding to a customer. Step 424 includes sub-step 426. In sub-step 426, the content access server receives text information communicated by the set top box application. Operation proceeds from step 424 to step 428. In step 428, the content access server performs a search for content satisfying the query. The search of step 428, in some embodiments, includes a search for content satisfying the query which is available from any one of a national content library, a regional content library, and a local content library. Then, in step 430, the content access server communicates the result of a search performed using at least a portion of said search query to customer's set top box. Step 430 includes sub-step 432. In sub-step 432, the content access server presents a list of content satisfying the text search information to the set top box application being executed at the customer premise. Operation proceeds from step 430 to step 434. In step 434, the content access server receives content selection information from said customer via a communications link, said content selection information indicating selected content. Step 436 includes sub-step 436. In sub-step 436, the content access server receives a signal indicating that the customer has selected an item from the list of content satisfying the text search information, said selected item to be added to a play list corresponding to the customer. Operation proceeds from step 434 via connecting node B 423 to step 438.

In step 438, the content access server makes the content available for delivery to said set top box at a content server used to deliver content to said set top box. Step 438 includes sub-steps 440, 442, 444, 446, 448 and 450. In sub-step 440, the content access server determines the location of the selected content in a hierarchy of content servers including at national content server, a plurality of regional content servers and local content servers. Then, in sub-step 442 the content access server checks if it was determined that the content is located at the local content server used to service said customer. If the selected content is located at the local content server used to service said customer, then operation proceeds from sub-step 442 to sub-step 444; in sub-step 444 it is recognized that selected content is available locally. Otherwise operation proceeds from sub-step 442 to sub-step 446. In sub-step 446 the content access server checks if it was determined that the content is located at the regional content server corresponding to the customer in the hierarchy of content servers. If it was determined that the selected content resides in the regional server corresponding to said customer, then operation proceeds from step 446 to step 448, where the content access server performs operations to result in the transfer of the content, e.g., copying of the desired content, from the one of the regional content servers corresponding to the customer to a local content server used to service said customer. Otherwise, operation proceeds from sub-step 446 to sub-step 450. In sub-step 450, the content access server performs operations to result in the transfer of the content, e.g., copying of the desired content, from the national server to the one of the regional content servers corresponding to the customer and then from the one of the regional content servers corresponding to the customer to a local content server used to service said customer. Operation proceeds from step 438 to step 452.

In step 452 the content access server updates a set of play list information corresponding to said customer to include the selected item. Operation proceeds from step 452 to step 454. In step 454, the content access server notifies the customer of the availability of said selected content to a set top box corresponding to said customer which can be used to output the selected content to a display device. Step 454 includes sub-step 456, 458 and 460 which may be, and sometimes are, performed in parallel.

In sub-step 456 the content access server sends an E-mail to said customer notifying the customer of the availability of the selected content. In sub-step 458, the content access server controls the set top box corresponding to said customer to generate a content availability notification on a display device coupled to said set top box. In sub-step 460, the content access server sends an SMS message to a telephone corresponding to said customer, said SMS message notifying the customer of the availability of the selected content. Operation proceeds from step 454 via connecting node C 461 to step 462.

In step 462, the content access server communicates the updated play list to said set top box and to web browser application thereby allowing said customer to obtain synchronized play list information from at least two different devices located at a customer premise corresponding to said customer. Operation proceeds from step 462 to step 464.

In step 464, the content access server receives a play request from said customer requesting said selected content. Operation proceeds from step 454 to steps 466 and step 468. In step 466, the content access server provides the selected content to the set top box corresponding to the customer. In step 468 the content access server updates billing information corresponding to said customer as a function of the content selected by said customer. Step 468 includes sub-step 470 in which the content access server updates billing information corresponding to said customer to include a charge for the selected content that was provided.

Figure 5:
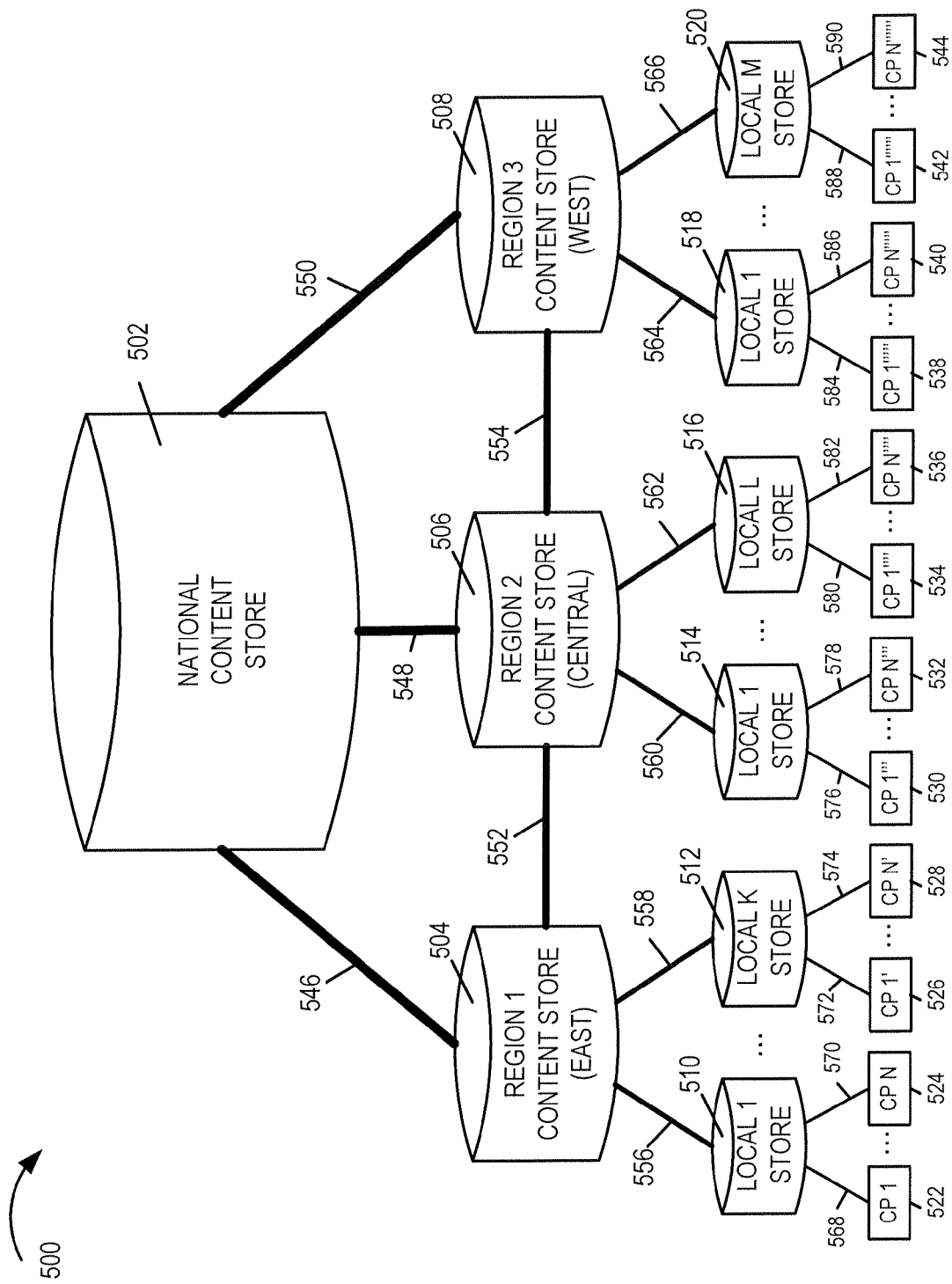
FIG. 5 is a drawing of an exemplary hierarchical data distribution system implementation in accordance with one embodiment of the present invention.

FIG. 5 is a drawing of an exemplary hierarchical data distribution system 500 implemented in accordance with one particular exemplary embodiment of the present invention. In some embodiments, data storage capacity is increased at content stores higher in the hierarchy more frequently than at the content stores lower in the hierarchy. This approach allows upgrades at one or a few servers to vastly increase the total number of titles available in the system while leaving the majority of the servers and content stores unchanged. Thus, the arrangement provides a reasonable way to address the storage problems associated with supporting a large and growing number of titles without incurring the problems associated with having to upgrade all or the majority of the servers and associated content stores in a system as the number of titles increases.

Exemplary hierarchical data distribution system 500 includes a multi-region, e.g., national, content store 502 and a plurality of regional content stores (region 1 (east) content store 504, region 2 (central) content store 504, and region 3 (west) content store 508) coupled to the national store 502 via links (546, 548, 550) respectively. Region 2 content store 506 is also coupled to region 1 content store 504 and region 3 content store 508 via links (552, 554), respectively.

Hierarchical data distribution system 500 also includes a plurality of local content stores corresponding to each of the regional content stores. (Local content store 1 510, . . . , local content store K 512) are coupled to region 1 content store 504 via links (556, . . . , 558), respectively. (Local content store 1 514, . . . , local content store L 516) are coupled to region 2 content store 506 via links (560, . . . , 562), respectively. (Local content store 1 518, . . . , local content store M 520) are coupled to region 3 content store 508 via links (564, . . . , 566), respectively.

The national, regional and local content stores may be implemented as part of national, regional and local content servers, respectively used to implement, e.g., a cable television system. Links between the servers and thus content stores may be part of a cable television system providers network used for secure distribution of video, audio and/or other content. The higher the content store in the hierarchy the larger the storage capacity in many embodiments. In many implementations, the national content store includes many thousands of movie titles while the regional and/or local content stores may only support hundreds of movie titles at any point in time. In some embodiments content is passed up and down in the hierarchy but not between content servers at the same level in the hierarchy facilitating centralized control. However, in the FIG. 5 embodiment, communication between regional content stores is supported providing multiple communications paths and allowing for the possibility of one regional server supplying content from its content store to the content store of another regional server. Such an implementation can reduce delivery times and provide multiple possible sources for requested content reducing the potential traffic burden on some of communication links in the system.

In addition to the content stores, hierarchical data distribution system 500 also includes a plurality of customer premises corresponding to each of the local content stores. (Customer premise 1 522, . . . , customer premise N 524) are coupled to local content store 1 510 via links (568, . . . , 570), respectively. (Customer premise 1' 526, . . . , customer premise N' 528) are coupled to local content store K 512 via links (572, . . . , 574), respectively. (Customer premise 1" 530, . . . , customer premise N" 532) are coupled to local content store 1 514 via links (576, . . . 578), respectively. (Customer premise 1'" 534, . . . , customer premise N'" 536) are coupled to local content store L 516 via links (580, . . . , 582), respectively. (Customer premise 1"" 538, customer premise N"" 540) are coupled to local content store 1 518 via links (584, . . . , 586), respectively. (Customer premise 1""' 542, . . . , customer premise N""' 544) are coupled to local content store M 520 via links (588, . . . , 590), respectively.

In accordance with the invention, as discussed above, individual customer premises may include set top boxes coupled to televisions and separate computer systems. The computer system may include web based interface applications and a computer monitor which can be used to display web pages. Both the STBs and computer systems can interact with and be used to order content from the content servers. The set top boxes include interfaces which support ISA protocol signaling while the computer systems include interfaces which support Internet Protocol (IP) signaling and communication using IP packets. Set top boxes at customer premises may be coupled to the content servers via cable links while the computer systems may be coupled to the content servers directly or indirectly through an Internet connection.

Figure 6A:
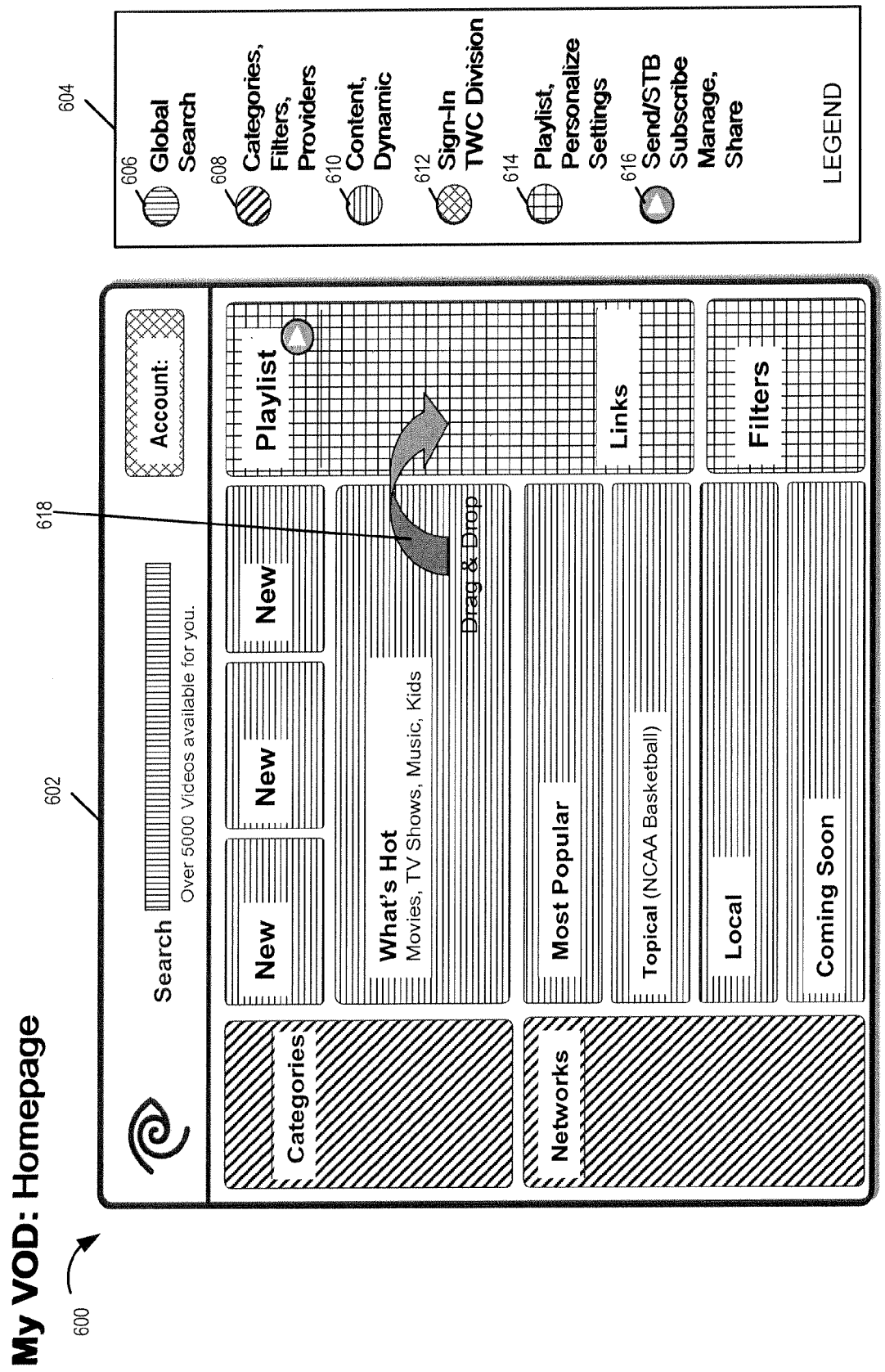

FIG. 6A is drawing 600 of an exemplary video on demand homepage 602, used in various embodiments of the present invention, and a corresponding legend 604 which identifies various regions of exemplary homepage 602. The VOD homepage 602 may appear on the customer's display screen via the customer Web browser interface.

Exemplary VOD homepage 602 includes: a global search region identified by vertical line shading 606; categories, filters, providers regions identified by diagonal line shading 608; dynamic content regions identified by horizontal line shading 610; an account information region identified by crosshatch shading 612; playlist, personal setting regions identified by vertical and horizontal line shading 614, and a playlist send button identified by an encircled arrow symbol 616.

Global search region 606 can accept text input from the customer, e.g., a title, actor name, director type, category name, keyword, descriptive text, etc., used to initiate a search for content. Categories and networks sections 608 allows a user to browse for content as a function of various filters, e.g., filtering on classifications of content, filtering on a network corresponding to content. Dynamic content sections 610 include New Content sections, a What's Hot section, a Most Popular section, A Topical section, Local Content section, and a Coming Soon section. Account information section 612 includes, e.g., account identification information corresponding to the signed-in customer, and information identifying the service provider corresponding to the signed-in customer. In some embodiments, the identifying service provider information includes information identifying a region or division, e.g., corresponding to a regional server. Playlist, personalized settings regions 614 includes a playlist section, e.g., a section including a list of user selected titles, a links section, e.g., providing links to playlist related items, e.g., including a link to subscription information, and a filters section, e.g., including a link to parental content information.

Playlist send button 616 can be used to initiate a send command of a customer generated playlist, e.g., to initiate an order for one or move selected VOD content items. The command to send the playlist also results in an update of a corresponding playlist used at a set top box interface corresponding to the customer.

The playlist can be updated by using an incorporated draw and drop feature as indicated by arrow 618. For example, a movie of interest may be dragged and dropped from the What's Hot section to the customer's playlist.

Figure 6B:
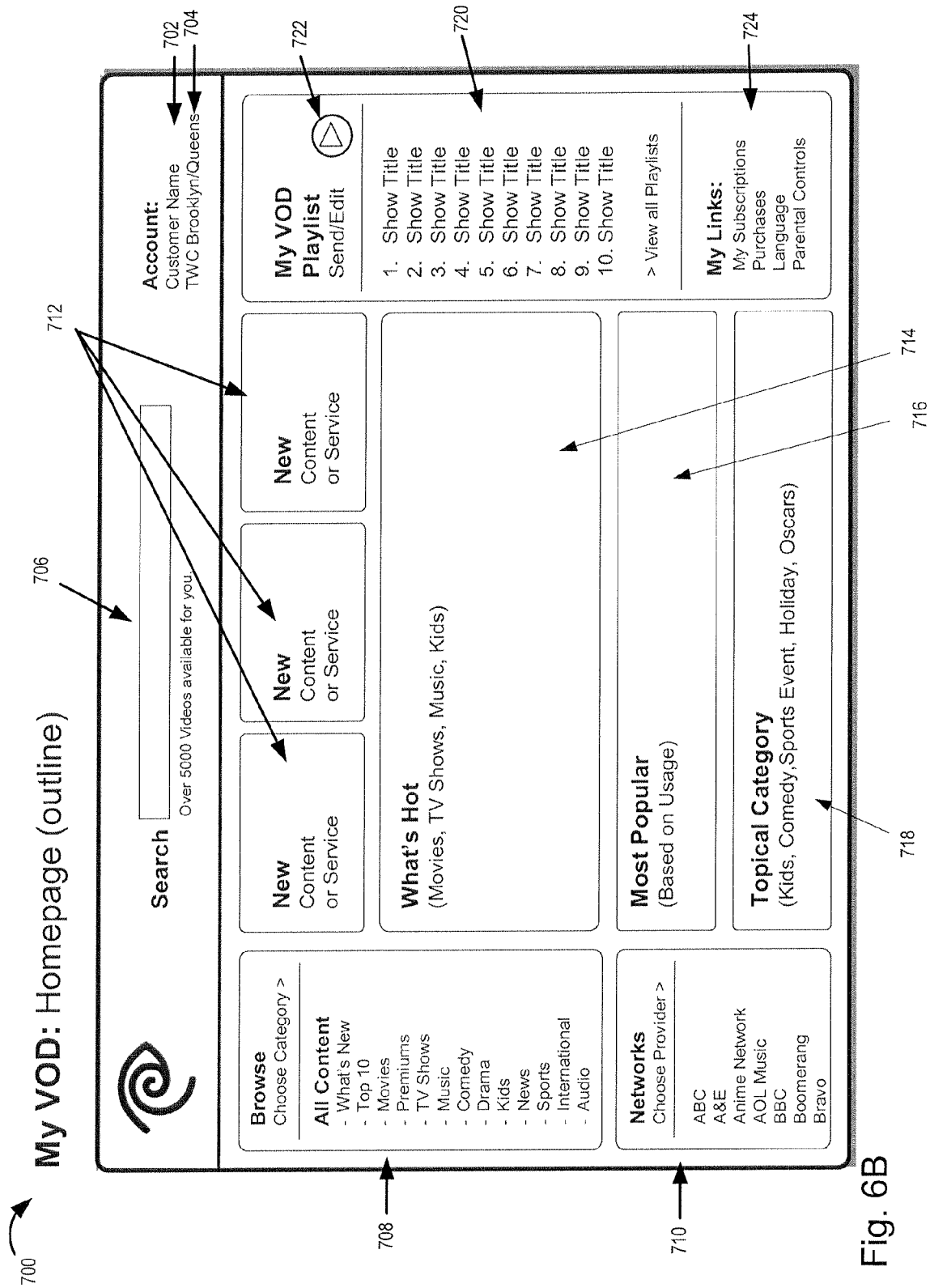

FIG. 6B is an illustration of the format of an exemplary video on demand homepage 700, used in various embodiments of the present invention. Exemplary Homepage 700 is a slight variation of exemplary homepage 602. The VOD homepage 700 may appear on the customer's display screen via the customer Web browser interface. The exemplary VOD homepage 700 includes account identification information including a customer name 702 and a service provider information 704, e.g., regional association information, a search field for accepting text input 706, browse features selectable based on content 708, browsing features based on provider 710, information identifying new content and services 712, information identifying What's Hot 714, information identifying Most Popular by usage 716, and information identifying topical categories 718. The VOD homepage 700 also includes a playlist section 720 including a list of selected titles, and a links section 724. Content, e.g., a movie or show, may be selected from a location on the display, e.g., from one of the windows displayed in the center area of the display, and placed in the playlist via a supported drag and drop feature. A send button 722 in the playlist section, is responsive to a user click to send an order for content.

Figure 6C:
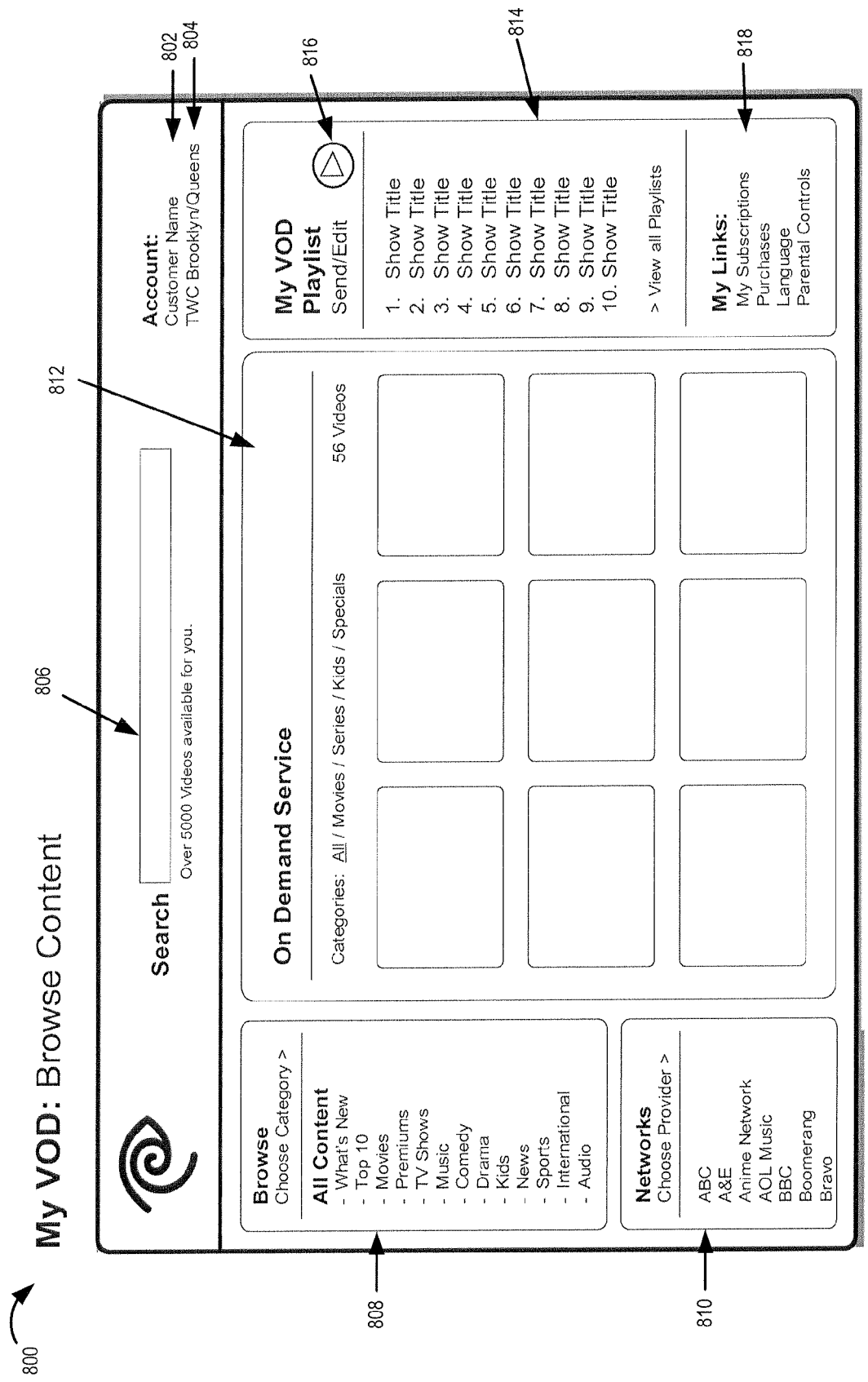

FIG. 6C is an illustration of the format of an exemplary browse by content screen display 800, e.g., generated when the customer has selected to be directed to the browse by content page 600. For example, a customer viewing VOD Homepage 700 may have positioned the mouse screen location indicator on All Content in the Browse Field 708 and clicked on the location such as to initiate a display update to the browse content page 800. Exemplary browse by content screen display 800 includes the same display on the top and sides as used in the VOD homepage 700. Exemplary browse by content page 800 includes account identification information including customer name 802 and a service provider information 804, e.g., regional association information, a search field for accepting text input 806, browse features selectable based on content 808, browsing features based on provider 810, a playlist section 814 including a list of selected titles, a links section 824, and a send button 816 in the playlist section, which is responsive to a user click to send an order for content. The center area 812 of browse content page 800 has been changed from the homepage display 700. Center area 812 includes On Demand Service information corresponding to content for individually selectable available content. In this example, the format is such to display information corresponding to 9 different potential titles simultaneously which may be selected. Since "all content" has been selected, the display starts at the beginning of the content library directory, e.g., alphabetically providing titles. Information corresponding to blocks of titles, e.g., sets of 56 titles may be transferred at a time. The user may scroll up or down to view information about the block of loaded titles. At the end of scrolled display corresponding to the block of titles, the user is provided with the option to advance to the next block and/or to go back to a previous block, to view information about additional titles. A user may also enter text into the search field 806 to redirect the search, e.g., enter the letter R to move the display to present titles starting with the letter R, or enter an actors name to start displaying content information corresponding to the actor. Center area 812 also includes a list of the currently selected search category, which is underlined, and at least some alternative categories, e.g., categories that the user frequently selects when searching. By clicking on one of these alternatives, the search can be redirected to a different category. If the customer finds a title of interest, the customer can use the drag and drop feature to add the title to the playlist 814.

FIG. 6D is an illustration of the format of an exemplary title information screen display 900, e.g., generated when the customer has selected to be directed to display title information page. For example, a customer viewing Browse Content page 800 may have positioned the mouse screen location indicator on a movie of interest, e.g., "The Aviator" and clicked on the location such as to initiate a display update to the title information page 900. Alternatively, the customer, e.g., using VOD homepage 700 may have entered information in the search field which identified the particular movie to be displayed. Exemplary title information screen display 900 includes the same display on the top and sides as used in the VOD homepage 700. Exemplary title information page 900 includes account identification information including customer name 902 and a service provider information 904, e.g., regional association information, a search field for accepting text input 906, browse features selectable based on content 908, browsing features based on provider 910, a playlist section 924 including a list of selected titles, a links section 928, and a send button 926 in the playlist section, which is responsive to a user click to send an order for content. The center area 912 of title information page 900 has been changed from the homepage display 700. Center area 912 includes a picture 914 associated with the content, and descriptive text associated with the content, e.g., title, rating, price, runtime, network, channel, availability information, description, actor information, director information, format information, language information, award information, rating information, related movie suggestion information. Center area 912 also includes a viewing options section 918 including a button 920, which can be clicked on for seeing a preview and a button 922, which can be clicked on for adding the title to the playlist 924.

Figure 6E:
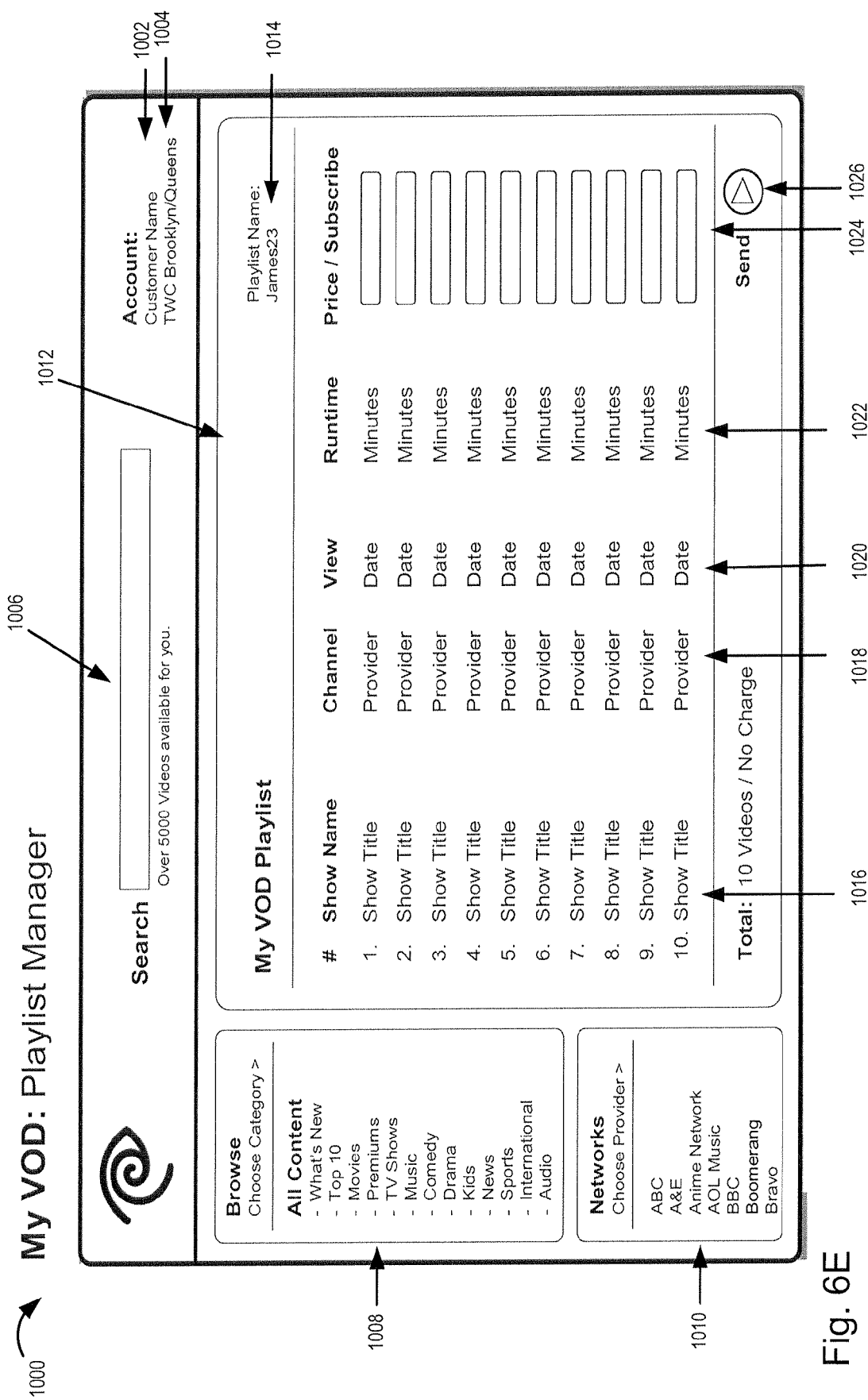

FIG. 6E is an illustration of the format of an exemplary playlist manager screen display 1000, e.g., generated when the customer has selected to be directed to the playlist manager page. For example, a customer viewing one of the Homepage display 700, Browse Content page 800 or Title Information page 900 may place the mouse indicator over the words My VOD Playlist and click resulting in the transfer to the Playlist manager screen display 1000. Exemplary Playlist Manager screen display 1000 includes the same display on the top and left side as used in the VOD homepage 700. Exemplary title information page 1000 includes account identification information including customer name 1002 and a service provider information 1004, e.g., regional association information, a search field for accepting text input 1006, browse features selectable based on content 1008, and browsing features based on provider 1010. The right lower display area 1012 of playlist manager information page 1000 has been changed from the homepage display 700. My VOD playlist area 1012 includes playlist name information 1014 and show information. In some embodiments, a customer account name can, and sometimes does, have a plurality of different associated concurrent playlists. For example, the customer name may correspond to a family's set top box, and individual members within the family may generate different individual playlists. In some embodiments, different filtering, e.g., parental control filtering, is applied with respect to the different family members, thus restriciting searching, ordering and/or purchasing.

Show information included in My VOD playlist area 1012 includes a first column 1016 of program titles, a second column 1018 of channel, e.g., provider identification, information, a third column 1020 of view data/time information 1020, a fourth column 1022 of program runtime information, and a fifth column 1024 of price/subscribe information. Various charging structures are possible, and in some embodiments, combinations of different types of charging structures are implemented. Some example of charging structures include: a charge per program per view, a charge per program for a limited time range, a charge as part of a subscription package purchase including a set of programs, and a charge as part of a subscription package including a set of channels. Some VOD content may be only available using one particular type of charging structure, e.g., the user needs to purchase a package to view the content. Other VOD content may be available through a plurality of purchase alternatives, e.g., package purchase, individual title purchase for a set time interval.

The playlist manager allows the customer to edit the playlist, e.g., delete listed items via mouse operations. Playlist manger display page 1000 also includes a send button 1026, which may be clicked on to send the playlist, e.g., place an order for the items listed on the playlist.

Figure 6F:
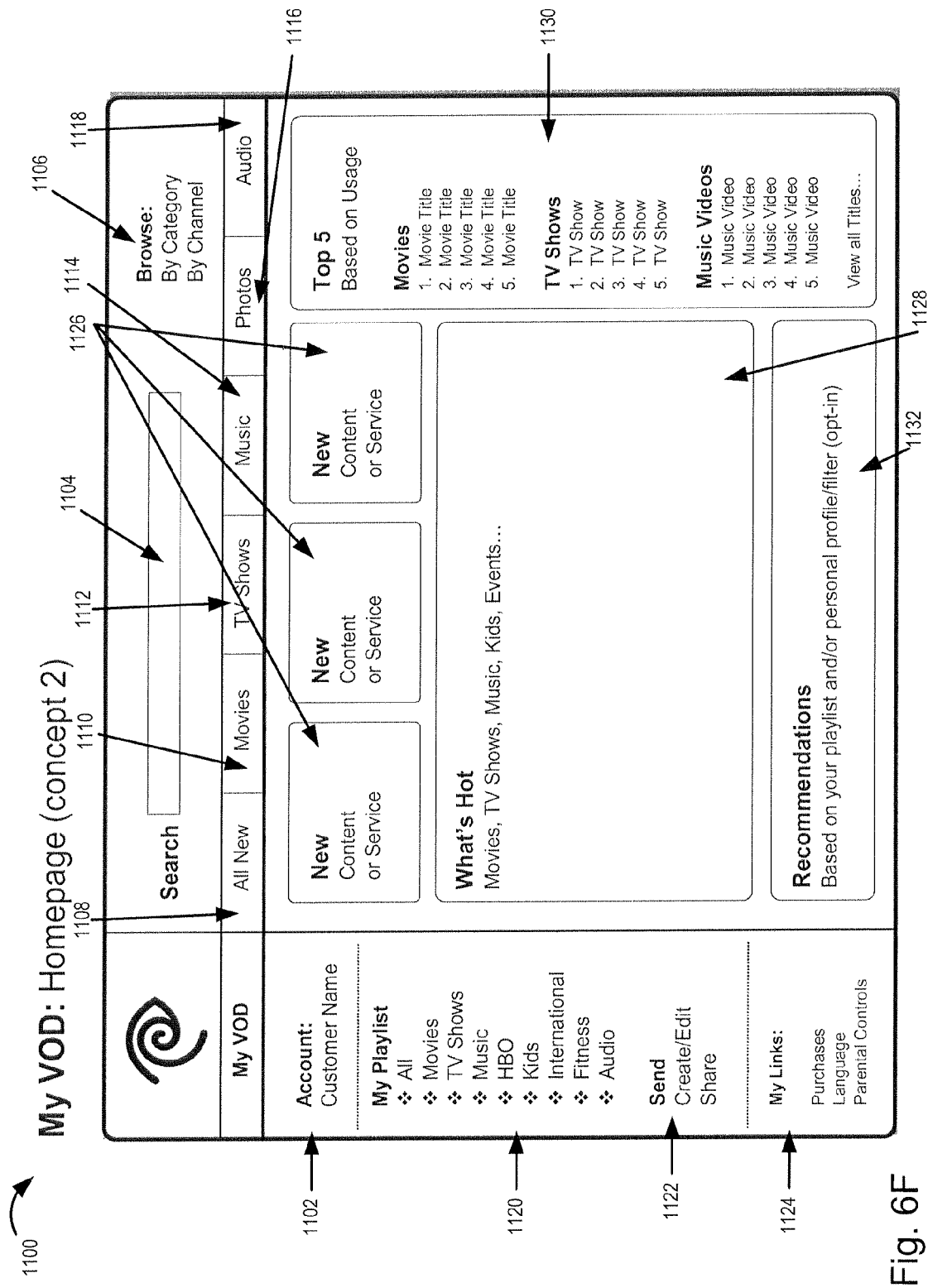

FIG. 6F is an illustration of the format of another exemplary video on demand homepage 1100, used in various embodiments of the present invention. The VOD homepage 1100 may appear on the customer's display screen via the customer Web browser interface. The exemplary VOD homepage 1100 includes account identification information 1102 including a customer name 1102; a search field for accepting text input 1104; a browse area 1106 supporting redirection to browse by category and by channel, a My Playlist area including playlist information corresponding to various categories 1120 and commands related to playlists section 1122, e.g., send, create/edit, share; information identifying new content and/or services 1126; information identifying What's Hot 1128; information identifying Recommendations 1132 based on the customer's playlist and/or person profile information; and a top 5 section base on usage corresponding to a plurality of categories, e.g., movies, TV shows, music videos 1130.

In addition, exemplary VOD homepage 1100 includes a row of buttons (all new 1108, movies 1110, TV shows 1112, music 1114, photos 1116, and audio 1118) corresponding to different search categories, facilitating easy redirection to a desired search category.

In some embodiments, a customer, is allowed to select from a plurality of alternative VOD Homepage layouts to choose the alternative which best suits the customer's needs. In some embodiments, a customer can build a customized VOD Homepage layout by selecting between presented options for incorporation.

Figure 7:
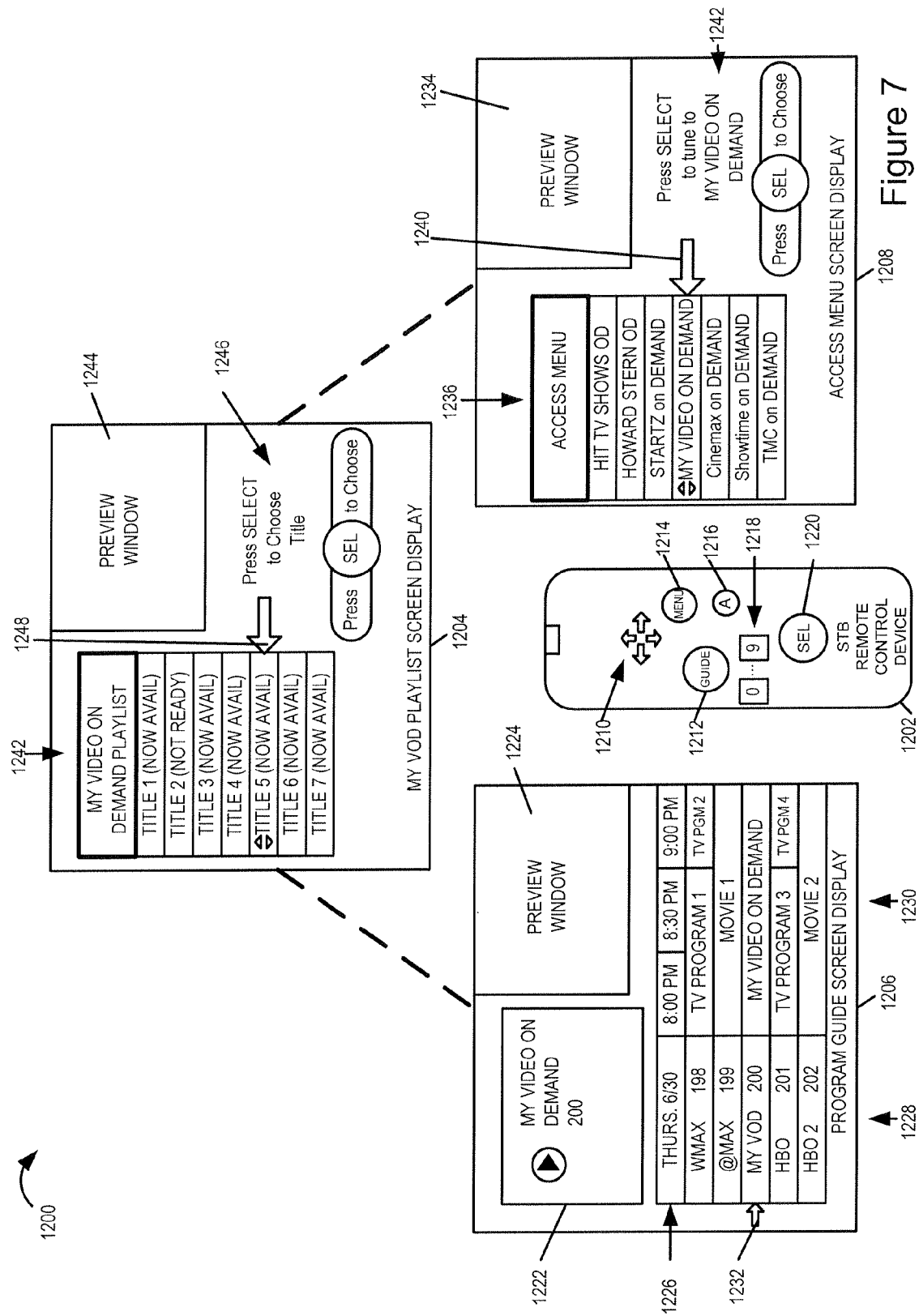
FIG. 7 illustrates an exemplary set top box remote control device and several exemplary screens that are displayed on a television coupled to a set top box and used in a content delivery system including customized video on demand services in accordance with various embodiments of the present invention.

FIG. 7 includes drawing 1200 illustrating an exemplary set top box remote control device 1202 and several exemplary screens (1204, 1206, 1208) that are displayed on a television coupled to a set top box and used in a content delivery system including customized video on demand services in accordance with various embodiments of the present invention. The customer can access the MY VOD PLAYLIST screen 1204 via several alternatives.

Set top box remote control device 1202 includes navigation keys 1210 for moving up/down left/right on the various screens, a guide selection key 1212, a menu selection key 1214 used to obtain the access menu, an A key 1216 which can also be used to obtain the access menu from certain other screens, a set of numeric character keys 1218, and a selection key 1220.

Program guide screen display 1206 includes a date/time row 1226, a column 1228 identifying various available virtual channels by description and an associated virtual channel number. In this example, virtual channel 200 is reserved for MY VOD. In some embodiments, different customers can have, and sometimes do have, a different virtual channel assignment associated with the MY VOD service. Program guide screen display 1206 also includes a column 1230 listing the TV programs, movies, and/or other content in their respective time slots. In addition, the program guide screen display 1206 includes a preview window 1224, which may be used to display an image, e.g., related to the current channel and/or an advertisement, an area 1222 identifying and/or describing the current channel being pointed to and/or highlighted, and an indicator 1232 used for indicating the current channel being pointed to and/or highlighted. In some embodiments, indicator 1232 includes a shading and/or contrast difference which identifies one of the virtual channels.

Access menu screen display 1208 includes an access menu 1236, a preview window 1234 which may be used to display an image, e.g., related to an identified on-demand menu and/or an advertisement, an area 1242 describing how to obtain the desired menu, and an indicator 1240 used for indicating the current menu option being pointed to and/or highlighted which can be selected. In some embodiments, indicator 1240 includes a shading and/or contrast difference which identifies one of the menu options offered. Access menu 1236 lists the various on-demand services available including a MY VOD service.

MY VOD PLAYLIST screen display 1204 includes a MY VOD playlist 1242, a preview window 1244 which may be used to display an image, e.g., related to an identified title and/or an advertisement, an indicator 1248 for pointing to and/or highlighting one or the titles on the playlist, and an area 1246 describing how to signal choice of the title being pointed to and/or highlighted. In some embodiments, indicator 1248 includes a shading and/or contrast difference which identifies one of the titles. The playlist 1242 lists titles which the customer has ordered to have available for viewing selection. The playlist 1242 also lists current availability information associated with the titles. In this example, 6 or the seven titles are now available; however one title is not currently available. That unavailable title corresponds, e.g., to a movie which was requested by the customer to be added to the playlist and is now in the process of being copied, e.g., from a national data store to the regional data store serving the customer.

As previously mentioned, in this exemplary embodiment, there are several alternatives that may be used to obtain the MY VOD playlist screen 1204. In one approach, the customer presses the guide button 1212 on STB remote control device 1202, which results in program guide screen display 1206 appearing on the television coupled to the set top box. The customer can then navigate through the screen, e.g., using arrow keys 1210. The customer moves the indicator 1232 to identify the MY VOD virtual channel 200 as shown in exemplary screen 1206. Then, by pressing the select button 1220 of remote control device 1202, the set top box is sent a command signal resulting in the display of the MY VOD PLAYLIST screen 1204 on the television coupled to the STB.

In another approach, the customer presses the menu button 1214 or A button 1216 on STB remote control device 1202, which results in access menu screen display 1208 appearing on the television coupled to the set top box. The customer can then navigate through the screen, e.g., using arrow keys 1210. The customer moves the indicator 1240 to identify the MY VOD menu option as shown in exemplary screen 1208. Then, by pressing the select button 1220 of remote control device 1202, the set top box is sent a command signal resulting in the display of the MY VOD PLAYLIST screen 1204 on the television coupled to the set top box.

In still another approach to obtaining the MY VOD PLAYLIST screen 1204, the customer directly tunes, e.g., from another menu, in which the customer enters the virtual channel number corresponding to the MY VOD PLAYLIST, e.g., 200 in this example, using the numeric keys 1218 on remote control device 1202.

In various embodiments, there are multiple screens and/or layers of screens corresponding to the MY VOD virtual channel, e.g., supporting multiple playlists. For example, in one exemplary embodiment, selection of the MY VOD from the access menu screen, selection of the VOD channel from the program guide menu screen, and direct tune to the MY VOD virtual channel transfers to an entry level MY VOD screen, e.g., which provides alternative options to transfer to specific individual MY VOD playlist screens. Different playlists may be, and sometimes are, directed to: different users such as different family members including, e.g., members with parental screening filtering control in effect; different devices; different categories of content; different time frames; different languages; different packages; different billing alternatives; and/or different plans.

Figure 8:
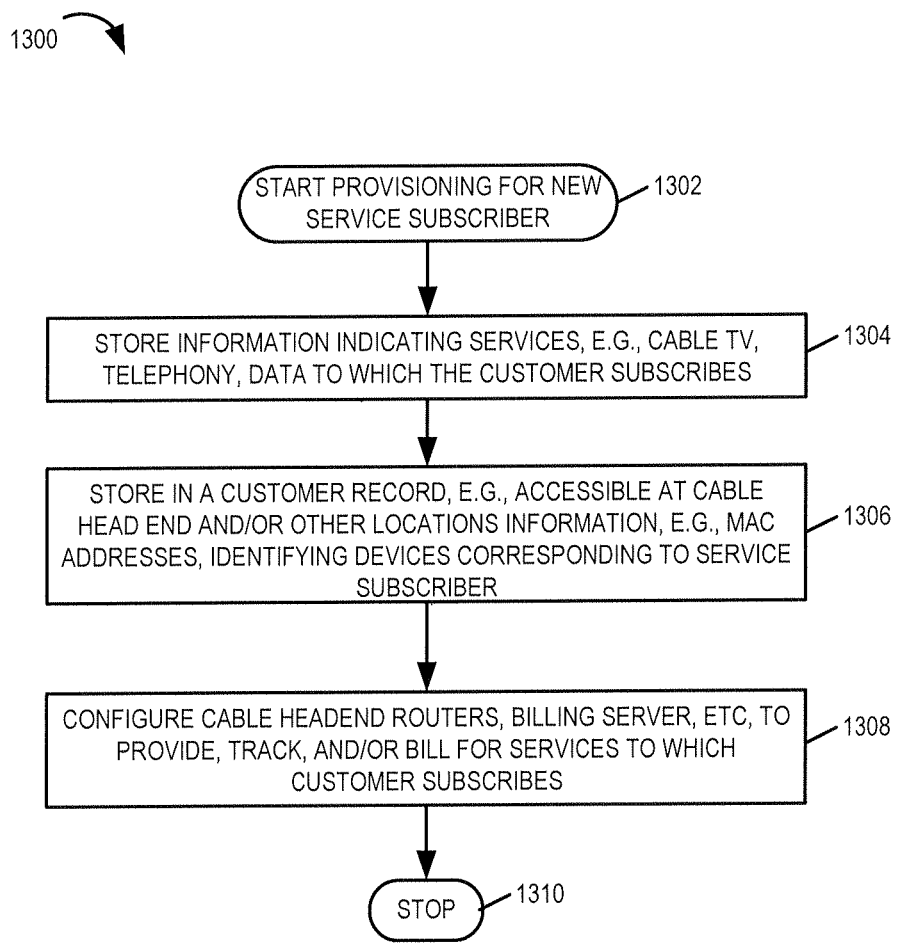
FIG. 8 is a drawing of an exemplary flowchart of a method of provisioning for a new service subscriber in accordance with various embodiments of the present invention.

FIG. 8 is a drawing of an exemplary flowchart 1300 of a method of provisioning for a new service subscriber in accordance with various embodiments of the present invention. The exemplary method starts in step 1302 in which the subscriber is identified and a new record in a database is set up or the subscriber is associated with an existing record in the database. For example, the subscriber may be an entirely new subscriber or the subscriber may be a previous customer or current customer adding a service, adding devices, adding features, upgrading, and/or changing. Operation proceeds from start step 1302 to step 1304.

In step 1304, information is stored indicating the services, e.g., cable TV, telephony, data to which the customer subscribes. Exemplary services can include various levels of cable TV plans and/or packages; various ON demand content services including, e.g., MY Video on Demand, music on demand, other audio on demand such as services including radio programs, audio books, tour information, instructional information such as language lesson instructions, etc.; data services such as location related services including map/navigation services; wireless phone and/or wireless data services; Internet services and/or landline phone services.

Then, in step 1306, information, e.g., MAC addresses, identifying devices corresponding to the service subscriber are stored in a customer record. For examples, devices corresponding the customer include, e.g., televisions, recording devices such as a digital video recorder, personal computer, cell phone, personal digital assistant, IPTV device, portable movie storage/play device, navigation/map system, IPOD, audio output devices, etc. The customer record is, e.g., accessible at the cable headend and/or other locations. Next in step 1308, the cable headend routers, billing server, etc. are configured to provide track and/or bill for services to which the customer subscribes. Operation proceeds from step 1308 to stop step 1310. The stored information is available for future use, e.g., when the customer orders and/or purchases VOD content.

Figure 9A:
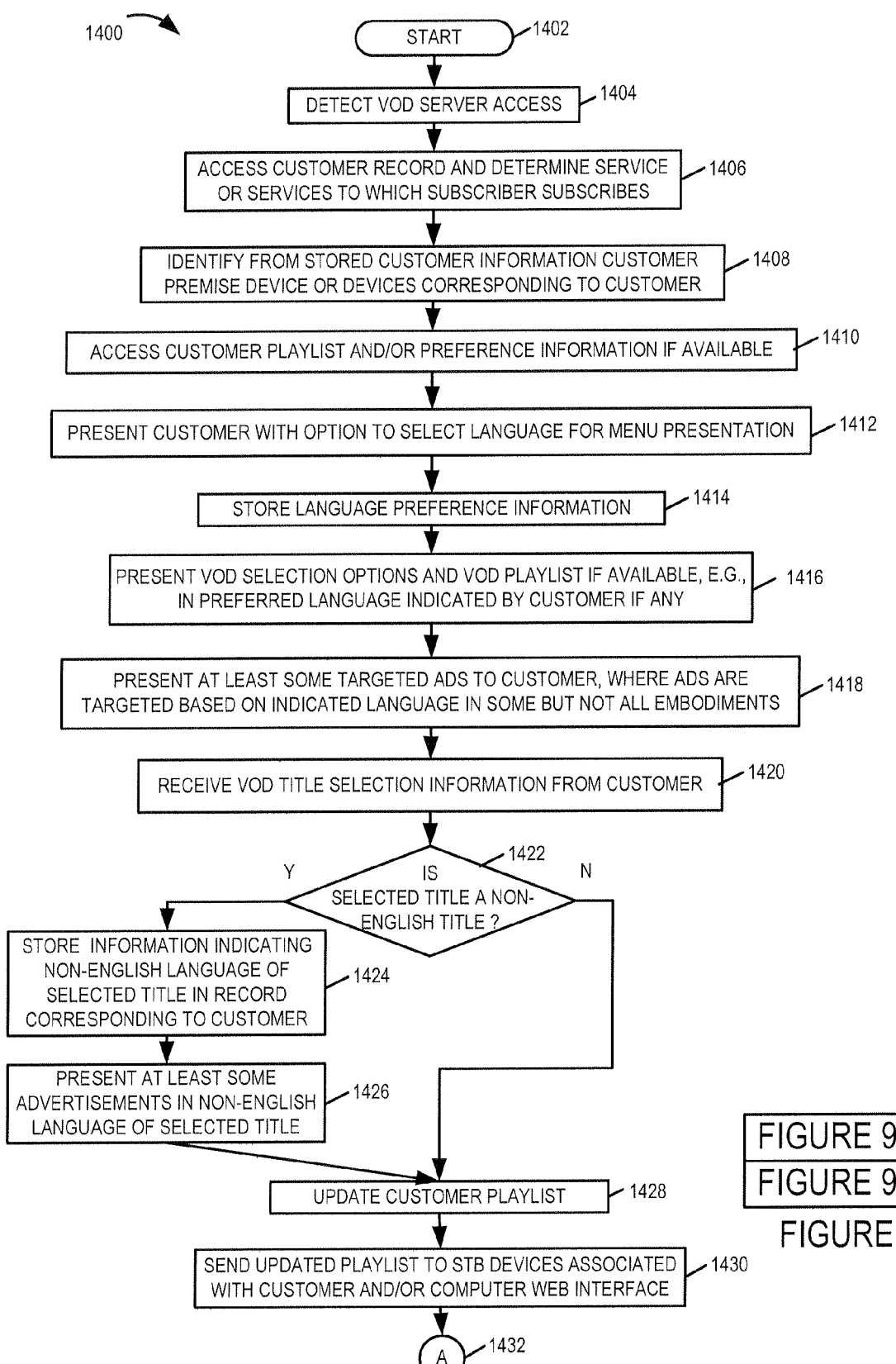
FIG. 9 comprising the combination of FIG. 9A
FIG. 9B is a drawing of a flowchart of an exemplary method used in operating an on-demand content delivery service, e.g., including video on demand, in accordance with various embodiments of the present invention.
Figure 9B:
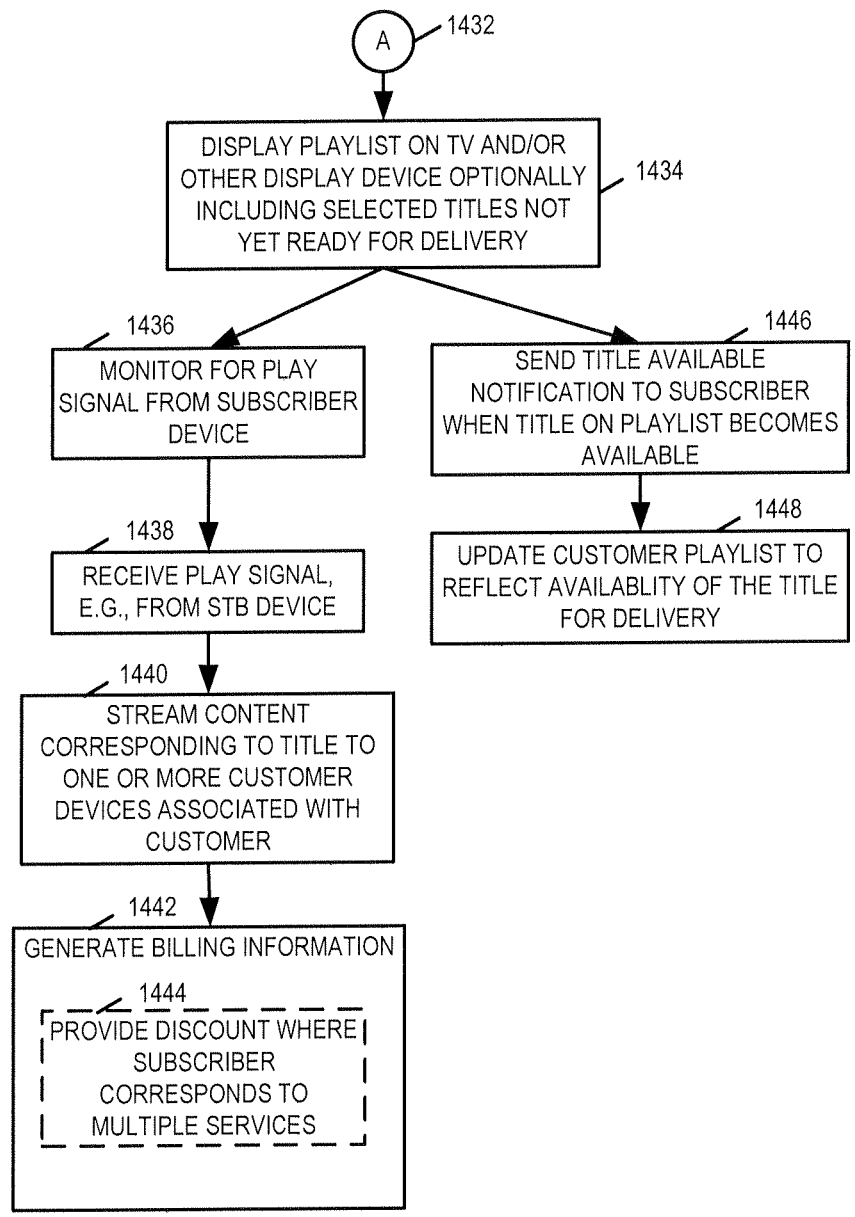

FIG. 9 comprising the combination of FIG. 9A and FIG. 9B is a drawing of a flowchart 1400 of an exemplary method used in operating an on-demand content delivery service, e.g., including video on demand, in accordance with various embodiments of the present invention. Operation starts in step 1402, where the system is initialized and proceeds to step 1404. In step 1404, a detection is made of a VOD server access. For example, a customer has used a Web based interface to obtain a My VOD entry level menu. Alternatively, a customer has used the STB remoter controller, or a CPE device interface coupled to the service provider cable network, to navigate through menus and obtained a MY VOD entry level menu.

Operation proceeds from step 1404 to step 1406. In step 1406, the service provider's system accesses the customer record corresponding to the access and determines the service or services to which the customer subscribes. Then, in step 1408, the customer premise device or devices corresponding to the customer are identified from stored customer information. In step 1410 the service provider's system accesses a customer playlist and/or preference information if available. Next, in step 1412, the service provider's system presents the customer with an option to select language for the menu presentation. Operation proceeds from step 1412 to step 1414, where the service provider's system stores language preference information. Then, in step 1416, the service provider system presents the customer with VOD selection options and a VOD playlist if available, e.g., in the preferred language indicated by the customer, if any. Operation proceeds from step 1416 to step 1418, in which the service provider system presents at least some targeted advertisements to the customer, where the advertisements are targeted based on the indicated language in some, but not all, embodiments. Then, in step 1420, the service provider system receives VOD title selection information from the customer. Next, in step 1422, the service provider system determines whether or not the selected title is a non-English title, e.g., corresponds to a foreign language movie selection. If the selected title is a non-English title, then operation proceeds from step 1422 to step 1424; otherwise, operation proceeds to step 1428.

In step 1424, the service provider's system stores information indicating the non-English language of the selected title in a record corresponding to the customer. Then, in step 1426, the service provider's system presents at least some advertisements in the non-English language of the selected title. Operation proceeds from step 1426 to step 1428.

In step 1428, the service provider system updates the customer playlist and then in step 1430 sends the updated playlist to set top box devices associated with the customer and/or computer web interface. Operation proceeds from step 1430 via connecting node A 1432 to step 1434. In step 1434, the playlist is displayed on TV and/or other display devices optionally including selected titles not yet ready for delivery. Operation proceeds from step 1434 to steps 1436 and step 1446.

In step 1446, the service provider system sends a title available notification to a subscriber when a title on the playlist becomes available. Operation proceeds from step 1446 to step 1448, in which the customer playlist is updated to reflect availability of the title for delivery.

In step 1436, the service provider system, monitors for a play signal from a subscriber device. In step 1438, the service provider system receives a play signal, e.g., from a set top box device, e.g., in response to a customer selecting a VOD movie on the playlist and placing an order requesting content delivery. Then, in step 1440, the service provider system streams content corresponding to the title to one or more customer devices associated with the customer. Operation proceeds from step 1440 to step 1442, in which the service provider system generates billing information. In some embodiments step 1442 includes sub-step 1444. In sub-step 1444 the service provider system provides a discount where the subscriber corresponds to multiple services. For example, a service provider may offer (i) My VOD included in cable service TV and (ii) cable based Internet service, and a customer subscribing to both the Internet and cable TV, in some embodiments, receives discounts regarding My VOD pricing with respect to a customer subscribing only to cable TV service.

Figure 10:
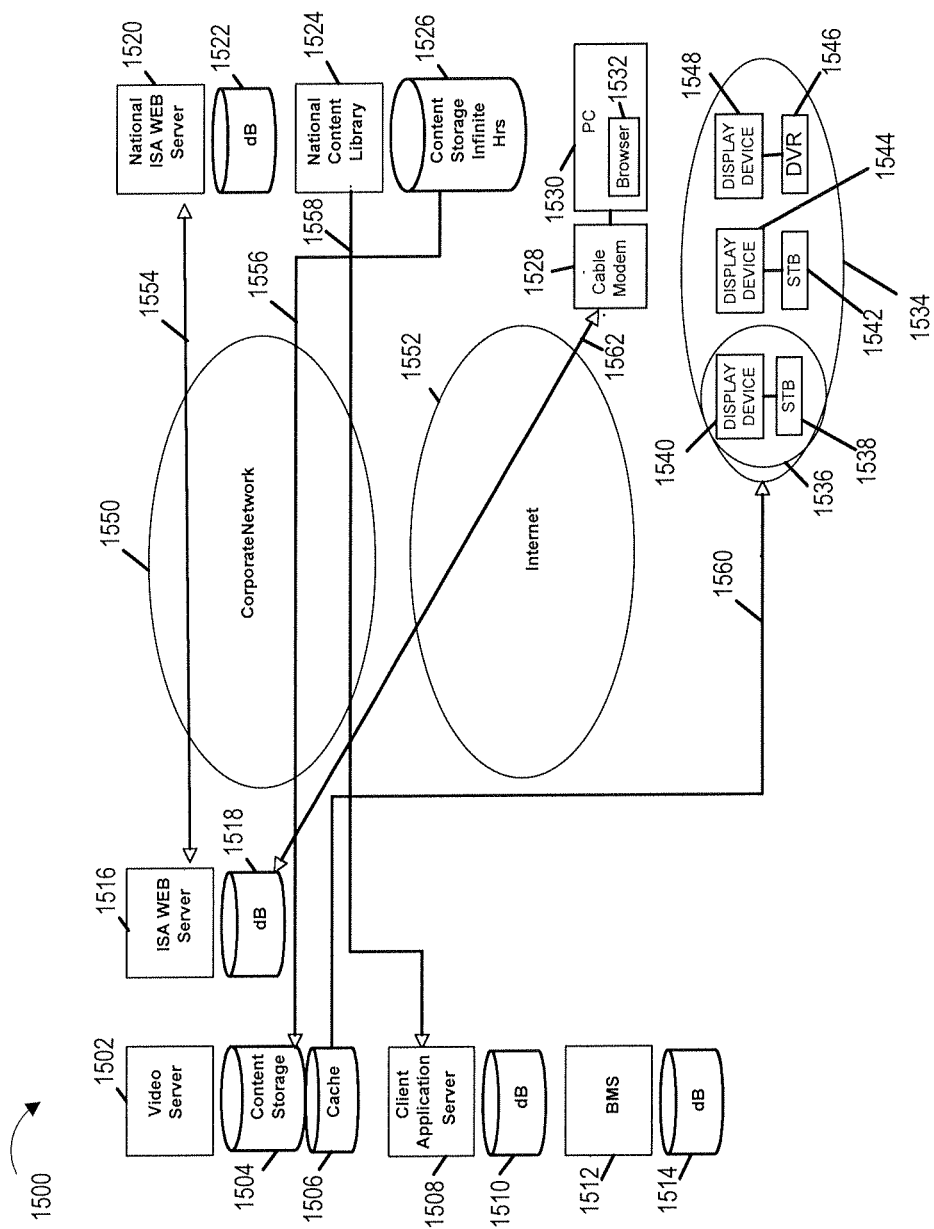
FIG. 10 is a drawing of an exemplary content delivery system including On demand services such as video on demand services.

FIG. 10 is a drawing of an exemplary content delivery system 1500 including On demand services such as video on demand services. Exemplary content delivery system 1500 includes a video server 1502, content storage 1504 including a cache 1506, a client application server 1508 and a corresponding client application server database 1510, a business management server (BMS) 1512 and a corresponding business management server database 1514, an ISA WEB server 1516 and a corresponding ISA Web server database 1518. In some embodiments, the set of devices (1502, 1504, 1506, 1508, 1510, 1512, 1514, 1516, 1518) corresponds to one of a plurality of service regions in delivery system 1500.

Exemplary content delivery system 1500 also includes a national ISA WEB server 1520 and a corresponding database 1522, a national content library 1554, and a very large content storage 1526 corresponding to the national content library 1524. Exemplary system 1500 also includes a number of customer service locations to which ordered content can be delivered, one of which is customer premise 1534. In this example, customer premise 1534 includes a plurality of interface devices and output devices, a first set top box 1538 coupled to a first display 1540, a second set top box 1542 coupled to a second display 1544, and a digital video recorder 1546 coupled to display 1548. Delivery system 1500 also includes an Internet interface which is cable modem 1528, a person computer 1530 coupled to modem 1528, and a Browser 1532 residing on the personal computer 1530 for providing access to the ISA Web server 1516. The Internet interface can be located at the same site as the location to which the ordered content is to be communicated, e.g., 1534, and/or may be at a different location, e.g., the work office site of the customer.

System 1500 includes both a corporate network 1550 and Internet infrastructure 1552 coupling various system components together. Line 1562 indicates that a customer can browse/search for available content, generate and update playlists for ON demand service including VOD via a Web interface, e.g., ordering a VOD movie. Line 1554 indicates that a regional ISA Web server 1516 communicates with a national ISA Web server 1520, e.g., forwarding a request for a movie not currently stored in the regional content storage 1504, but which is stored in national content library storage 1526. Line 1558 indicates the transfer of content from national content library store 1526 to regional store 1504, which may be placed in cache section 1506. Line 1560 illustrates delivery of VOD content to a subscriber site. Line 1558 indicates that the national content library 1524 signals the client application server 1508, e.g., providing notification of the transfer, e.g., copying, of content from the national store 1526 to the regional store.

Exemplary operational flow in accordance with the present invention in view of exemplary system 1500 will now be described. From home via a cable modem 1528 or other Internet connection or from another site, e.g., work, via a cable modem 1528 or other Internet connection, the customer uses a standard Internet browser 1532 to connect to the Web server 1516. The customer selects the "VOD" link and logs in with name and password to an account representing all or one of the STBs (1538, 1542) within the home. The divisional and national Web servers (1516, 1520) are 'linked' to provide a seamless user experience. The customer is presented with many possible navigation scenarios. The customer orders a movie, e.g., via the Web interface. The national content library 1524 calculates delivery time based on network metrics and historical data transfer rates. Messages are sent to the customer, e.g., "Your title will be delivered in # minutes and will be available for immediate playback until MM/DD/YY HH:MM (End of Cache Period). Would you link an email confirmation (Y/N)?" or :"You've GOT VOD." The message, in some embodiments, is similar to caller ID.

The national content library 1524 initiates the content transfer to the respective VOD server 1502 for that account using standard protocols (FTP, ADI, etc). In some embodiments only best effort delivery is required. A file, e.g., an MPEG file, is stored in the temporary or cache space 1506 of the local video server 1502 serving the service group of that STB (e.g., 1538) MAC address. Upon completion of the file transfer, the national content library 1524 updates the national web server 1520, e.g., sends an email confirmation, which is directed to the customer, e.g. the customer's E-mail address. Upon completion of the file transfer, the national content library 1524 also starts the cache period countdown timer. The National content library 1524 updates the database 1510 of the application server 1508 so that the title will appear in the "MY VOD" category, e.g., as available, for that customer as viewed via the set top box interface. The Web server (1520, 1516) updates the database 1518 so that the title will appear in the "MY VOD" category, e.g., as available, for that customer as viewed via the Web interface.

The customer launches VOD on the STB, e.g., 1538, and navigates to the "MY VOD" category and starts the desired title. Then the movie is streamed and the billing occurs similar to a regular VOD purchase. The BMS 1512 performs various billing related functions. If, for example, the customer does not order a title, e.g., a title which had been requested to be placed on the MY VOD playlist and which involved the copying of the content from the national content storage 1526 to the regional content store's cache 1506, prior to the end of "Cache Period" time associated with the title, the national content library 1524 will remove the title from the temporary storage 1506 on the respective VOD server 1502 and remove the title from the "My VOD" list on the Application server 1508. In addition, the title is removed from the corresponding My VOD list for the customer viewable via the Web interface.

Figure 11:
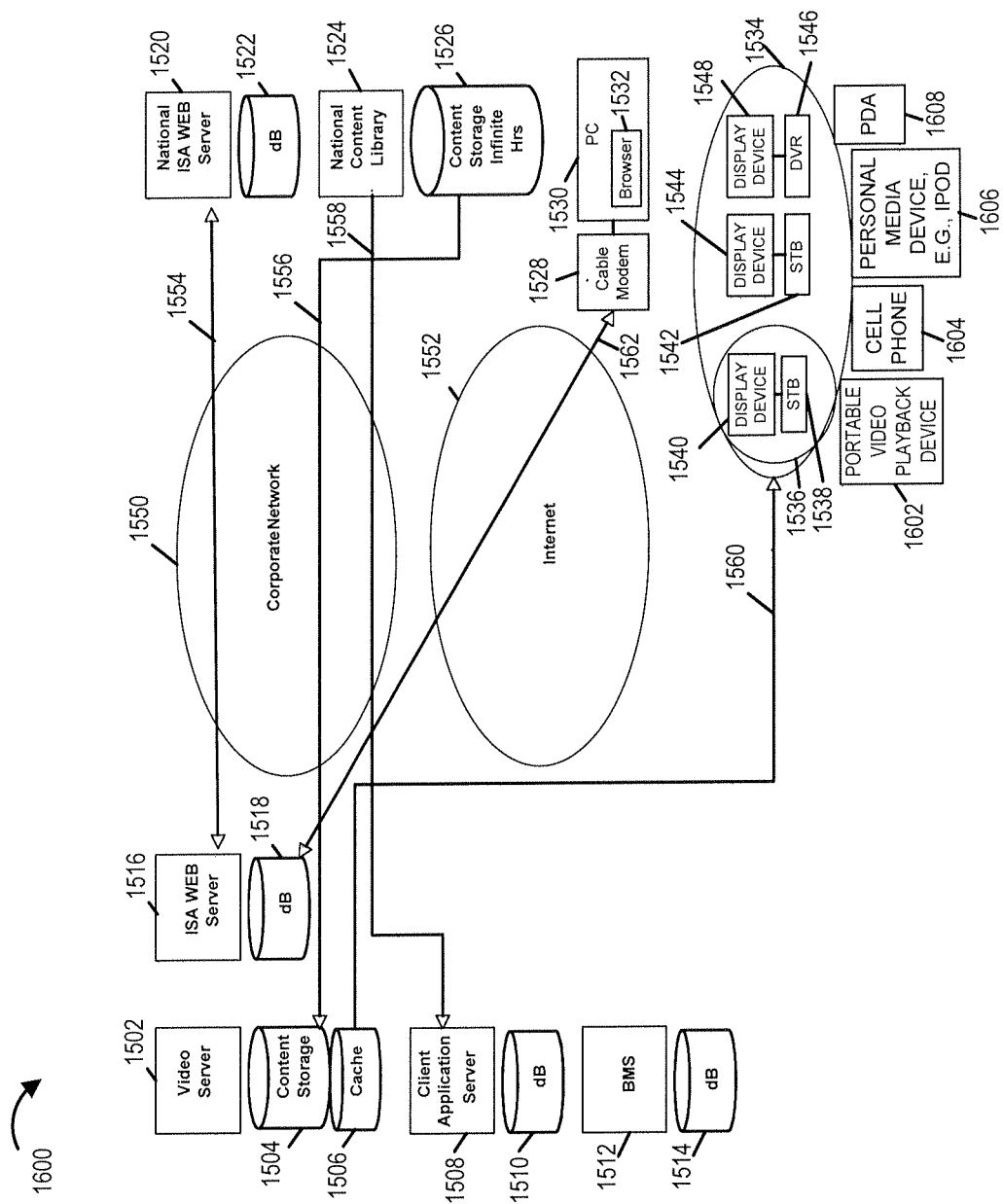
FIG. 11 is a drawing of an exemplary content delivery system including On demand services which is an extended version of the exemplary system of FIG. 10, the extended version supporting additional CPE devices.

FIG. 11 is a drawing of an exemplary content delivery system 1600 including On demand services which is an extended version of the exemplary system of FIG. 10. In additional to the components of system 1500, system 1600 includes various additional customer premise equipment (CPE) devices, e.g., portable video playback device 1602, cellphone 1604, personal media device, e.g., IPOD 1606, personal digital assistant (PDA) 1608, and other assorted wired and/or wireless devices such as, e.g, portable TV devices, portable audio playback devices, devices supporting IPTV, video gaming devices, electronic books, storage devices and/or playback devices. Note that system 1600 also includes digital video recorder (DVR) 1546 allowing ordered VOD content to be streamed to DVR 1546 for viewing on display device 1548, at a later time. DVR 1546, by providing video content storage at the customer premise, facilitates off peak hour streaming, freeing bandwidth during peak times for other users, e.g., users which do not have a DVR and need the video to be streamed as viewed.

The various CPE devices, in some embodiments, include one or more of the following: a hard drive, a cable modem and in home PCs for IPTV, personal media devices, and cell phones. The hard drive, e.g., a DVR hard drive can be used for storing direct downloads of ordered ON-demand VOD content, thereby offloading real-time streaming demands. In home IPTV devices can offer new viewing opportunities. Various personal media devices, e.g., cable to go devices, can be loaded with on-demand content, e.g., video, music, audio, text, etc., while connected via the cable interface, and then disconnected from the cable, and taken off with the content being available for access at sites outside the home, e.g., the purchased video program, audio program, music, etc., can be viewed and/or listened to throughout the day via the portable device. Cell phones, e.g., smart cell phones, with video display, can also be connected to the on-demand network and be loaded with content, e.g., a map corresponding to a location of interest to which the customer expects to travel.

When incorporating these additional CPE devices, different content formats are used and managed, for at least some devices, by the backend systems. Some differences are in terms of contract rights, codecs, resolutions, etc. Different rules may be, and sometimes are, implemented governing the availability of content across the devices.

In accordance with various embodiments of the invention, the Web experience is extended to provide a more personalized interface allowing for individual "accounts" or individual "My ON Demand" lists, e.g., "My VOD" lists, on the CPE devices. For example, each instance of "MY VOD" can be, and sometimes is, individually managed by a different person across the same or multiple CPE devices. Additionally, in some embodiments, the Web experience supports the uplink, management and distribution of user created content to others, e.g., a personalized "circle of friends".

In some embodiments, the content distribution system incorporates both off-line and real-time trans-coding and trans-rating engines. Additionally, in some embodiments, the network supports other network distribution technologies, e.g., WiFi and cell phone infrastructures.

Some embodiments include enhanced protocols. For example, some system embodiments, in accordance with the present invention, include burst load content delivery in which content is delivered faster than real time, e.g., with the content being sent directly to a DVR hard drive. Some system embodiments, in accordance with the present invention, include features to trickle in, e.g., to load a Personal Media Device attached to a USB port of a STB. Exemplary enhancements to the DSM-CC Session Setup protocols (SSP) aiding in the support to CPE devices include: (i) incorporation of CPE identifier which identifies the CPE type; (ii) incorporation of CPE supported Codecs—which identify the supported video formats like Codecs, bit rates, resolution; (iii) incorporation of a CPE maximum data rate—for session bandwidth based delivery greater than real-time delivery; (iv) incorportation of CPE minimum data rate—for session bandwidth based delivery less than real-time delivery; (v) RTSP—Real-Time Streaming Protocol Adaptation.

Exemplary additional operational flows in accordance with the present invention in view of exemplary system 1600 will now be described. A user can connect to the system from any Internet connection. The customer user a standard Internet browser, e.g., browser 1532, to connect to the Web server (1516/1520). The customer selects the "VOD link" and login in with the name and password to the account. The customer selects the CPE device, e.g., one of device (1602, 1604, 1606, 1608, 1546) and browses the content available for that device. Content is ordered and the network responds with a deliver time. The Web server (1520/1516) updates the database of the respective Application Server for that CPE, e.g., database 1510 of Application server 1508, so that the title will appear in the "My VOD" category for that customer and device. The network includes intelligence to route the content to the appropriate trans-coding and trans-rating engine and across the proper network topology to reach the CPE device. Customer is appropriately notified that the content is available, e.g., via e-mail, instant message, SMS message, etc. Available indication information, displayed on device playlists, are also updated, e.g., corresponding to both playlists viewable through the Web interface and through the cable interface such as STB and/or CPE device intended to receive the content. Customer launches CPE navigator application and navigates to the "My VOD" category and starts the desired title.

It should be appreciated that in various embodiment of the invention, the national content server includes many times the storage capacity included in any one of the regional servers coupled to the national content server, e.g., three, ten, 100 or even 1000 or more times the individual or average storage capacity found in the regional content servers. Thus, in some embodiments, the national content server includes three, ten, 100 or even 1000 or more times the number of titles, e.g., movies or other videos, found in the regional content servers. In addition, in at least some embodiments, the storage capacity is upgraded in the national content server more frequently than the regional content servers. This reflects the fact that in the hierarchical content storage arrangement used in various embodiments storage requirements may group at the top of the hierarchy due to adding large numbers of infrequently requested titles while the number of titles maintained in the regional stores may remain relatively constant or be allowed to grow at a much slower rate. In some hierarchical embodiments, the national content store includes a copy of all or the majority of titles which can be found in the regional content store. However, the regional content servers normally only store a fraction, e.g., less than half or even many fewer, of the titles available from a multi-region content store, e.g. national content store of a national content server.

While described in the context of a video on demand system, it should be appreciated that the methods and apparatus of the present invention are not limited to the delivery of video content and can be used to support delivery of audio content and/or other types of information content which may be requested by an IP based CPE device.

In various embodiments system elements described herein are implemented using one or more modules which are used to perform the steps corresponding to one or more methods of the present invention, for example, presenting the user with available content information, receiving a user input indicating a content request, estimating delivery time information, selecting a source for content, controlling the copying of content between servers, performing a cache timer operation, notifying a customer of content availability information, updating a rental list, triggering content streaming to a customer, etc. Such modules may be implemented using software, hardware or a combination of software and hardware. Each step may be performed by one or more different software instructions executed by a processor, e.g., CPU.

At least one system implemented in accordance with the present invention includes a means for implementing each of the various steps which are part of the methods of the present invention. Each means may be, e.g., an instruction, processor, hardware circuit and/or combination of elements used to implement a described step.

Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional embodiments, within the scope of the present invention, will be apparent to those of ordinary skill in the art in view of the above description and the claims which follow.

What is claimed is:

1. A method of providing on demand access to content stored in a network, the method comprising:
operating a regional web server to communicate a content selection page to a web browser application corresponding to a user and being executed on a first customer premise device located at a first customer premise;
updating a customer play list displayed by said web browser application corresponding to the user to add to the customer play list a title of content selected by the user via the web browser application;
receiving at said regional web server an order for content from the first customer premise device in response to user selection of an option displayed with said updated customer play list; and
in response to said received order for content, making said content available for download, making said content available for download including:
communicating information included in said received order for content to a controller that has access to information indicating content that is available from a national content store and regional content stores when it is determined that said content is not available from a regional content store which is accessible to a regional content server corresponding to a region to which said regional web server corresponds; and
operating said controller to: (i) select a content source to provide content requested in said received order, said selecting the content source being based on the cost of delivering content from the selected content source to said content server used to stream content to the customer premise equipment of the customer, and (ii) implement a preference for lower cost links which can be used to deliver content to said content server used to stream content to the customer premise equipment of the customer even when it results in a longer delivery delay than if the content source corresponding to more costly links was selected; and
wherein said controller selects the content source associated with the lowest delivery cost from the plurality of content sources.

2. The method of claim 1, wherein said option displayed with said updated customer play list is a send playlist option, the method further comprising:
in response to receiving said order, providing the updated customer play list to a second customer premise device located at said first customer premise which can also be used to update said customer play list corresponding to the user.

3. The method of claim 2, wherein said second customer premise device is a set top box device, the method further comprising:
receiving an order confirmation from said second customer premise device; and
transmitting content corresponding to said title added to the customer play list to the second customer premise device in response to said order confirmation from the second customer premise device, said order confirmation being used to initiate delivery of the content corresponding to the title added to the customer play list to the second customer premise device.

4. The method of claim 2, wherein said content selection page includes:
a search window in which the user can enter a search query; and
a content on demand play list portion in which said customer play list is displayed.

5. The method of claim 4, wherein said content selection page further includes: a search result window; and wherein the user can signal selection of an item in the search result window by dragging the item from the search result window to the content on demand play list.

6. The method of claim 5, wherein the customer play list is a video on demand play list which lists titles that are available to be delivered to a set top box device corresponding to the user.

7. The method of claim 5, wherein said content selection page further includes a window showing new video content which is available for ordering, local content which is available for ordering and a window showing different video categories from which video can be ordered.

8. The method of claim 7, wherein said content selection page includes a play list send option which allows the user to initiate the sending of an updated play list to a server which provided the content selection page.

9. The method of claim 4, wherein said content selection page includes in a set of VOD play list information, a list of show titles indicating the shows in the VOD play list, information indicating the provider of at least some shows in the VOD play list, runtime information indicating the runtime of shows in the VOD play list and price information indicating the cost for at least some titles listed in the VOD play list.

10. The method of claim 4, wherein said content selection page includes a share option for allowing the user to send the customer play list to another user.

11. The method of claim 1, wherein said regional web server and said regional content server correspond to a geographic region which is smaller than a national geographic region served by said controller and said national content store the method further comprising:
determining, prior to communicating information included in said received order for content to the controller, that the ordered content is not available from the regional content store.

12. The method of claim 2, further comprising:
operating the controller to initiate a transfer of the requested content from said national content store to the regional content store.

13. The method of claim 1, further comprising:
prior to transmitting selected content added to the play list to the second customer premise device,
receiving, at an application server used to handle purchase orders, a signal from the second customer premise device indicating a purchase of the selected content added to the play list, said application server being different from said regional web server and said controller.

14. The method of claim 13, further comprising:
prior to transmitting ordered content determining if the user selected an option to be notified when an ordered title becomes available for delivery.

15. The method of claim 1, further comprising:
detecting selection of a non-English title by said user;
storing information indicating the non-English language of the selected title; and
supplying at least some non-English language advertisements to the user.

16. The method of claim 15, wherein said at least some non-English language advertisements are in the non-English language of the selected title.

17. The method of claim 2, further comprising:
operating the controller to send a signal to update customer information on the regional web server when a transfer of said content from the national content store to a regional content store associated with said regional content server has been completed.

18. The method of claim 17, further comprising:
operating the controller to send a signal to an application server to notify the application server to update a rental list corresponding to a first customer corresponding to said first and second customer premise devices to include said content.

19. The method of claim 18, further comprising:
operating said application server to communicate the updated rental list to said second customer premise device.

20. The method of claim 19, further comprising
receiving, at said application server, an order confirmation from said second customer premise device indicating a purchase of said content; and
in response to said order confirmation, operating said application server to signal a video server to begin streaming said content from said regional content store to the second customer premise device.

21. The method of claim 20, further comprising:
operating the application server, following receipt of said order confirmation, to send content purchase information to a business management server used to bill said first customer for said content.

22. The method of claim 21, further comprising:
operating said controller to start a cache timer, following completion of delivery of said content to said regional content store, said cache timer being used to control how long said content will be stored in said regional content store without a customer purchase or additional customer order.

23. The method of claim 22, further comprising:
operating said controller to send a signal to said application server to remove said content from the rental list corresponding to the first customer in response to the cache timer expiring without a purchase of the content by said customer.

24. The method of claim 22, further comprising:
operating said controller to send a delete signal to said regional content store in response to the cache timer expiring without a purchase of the content by said customer or an additional customer order to trigger deletion of said content from said regional content store.

25. The method of claim 24, wherein said controller is a controller responsible for controlling storage of content included in said national content store.

26. The method of claim 25, wherein said first customer premise device is a personal computer; and wherein said second customer premise device is a set top box.

* * * * *